United States Patent
Yasuda et al.

(10) Patent No.: US 7,511,867 B2
(45) Date of Patent: *Mar. 31, 2009

(54) HOLOGRAM REPRODUCTION METHOD AND APPARATUS

(75) Inventors: Shin Yasuda, Kanagawa (JP); Katsunori Kawano, Kanagawa (JP); Koichi Haga, Kanagawa (JP); Jiro Minabe, Kanagawa (JP); Yasuhiro Ogasawara, Kanagawa (JP); Kazuhiro Hayashi, Kanagawa (JP); Hisae Yoshizawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 253 days.

This patent is subject to a terminal disclaimer.

(21) Appl. No.: 11/527,577

(22) Filed: Sep. 27, 2006

(65) Prior Publication Data

US 2007/0146846 A1    Jun. 28, 2007

(30) Foreign Application Priority Data

Dec. 26, 2005  (JP) .............................. 2005-373526
Dec. 26, 2005  (JP) .............................. 2005-373531
Jun. 20, 2006  (JP) .............................. 2006-170603

(51) Int. Cl.
  *G03H 1/16* (2006.01)
  *G03H 1/08* (2006.01)
(52) U.S. Cl. ............................. 359/29; 359/9; 382/210
(58) Field of Classification Search .................. 359/29, 359/32, 35; 382/210
  See application file for complete search history.

(56) References Cited

U.S. PATENT DOCUMENTS 5,488,494 A * 1/1996 Redfield et al. ............... 359/22
6,762,865 B1   7/2004 Edwards (Continued)

FOREIGN PATENT DOCUMENTS

JP     A 2000-66565    3/2000

(Continued)

OTHER PUBLICATIONS

Horimai et al.; "Collinear holography;" *Applied Optics*; Optical Society of America; vol. 44; No. 13; May 1, 2005; pp. 2575-2579.

(Continued)

*Primary Examiner*—Audrey Y Chang
(74) *Attorney, Agent, or Firm*—Oliff & Berridge, PLC

(57) ABSTRACT

A hologram reproduction method for reproducing a hologram from an optical recording medium in which the hologram is recorded by Fourier transforming a signal light, in which digital data is represented by an image of intensity distribution, and a reference light, and simultaneously irradiating the lights in a state in which a direct current component is removed from at least the Fourier transformed signal light onto the optical recording medium is provided. The method including: irradiating a read out reference light onto the optical recording medium, and generating a diffracted light from the recorded hologram; generating all or a part of a direct current component contained in a Fourier transformed image of the signal light; combining the diffracted light and the generated all or a part of the direct current component, and generating a combined beam; and reproducing the signal light by inverse-Fourier transforming the combined beam.

20 Claims, 15 Drawing Sheets

U.S. PATENT DOCUMENTS

| | | | |
|---|---|---|---|
| 6,809,845 B1 * | 10/2004 | Kim et al. ............... 359/9 |
| 7,262,892 B1 * | 8/2007 | Yasuda et al. ............ 359/29 |
| 2001/0007592 A1 | 7/2001 | Pu et al. |
| 2005/0134948 A1 | 6/2005 | Waldman et al. |
| 2006/0152783 A1 | 7/2006 | Butler et al. |

FOREIGN PATENT DOCUMENTS

| | | |
|---|---|---|
| JP | A-2000-066566 | 3/2000 |
| JP | A 2004-198816 | 7/2004 |

OTHER PUBLICATIONS

Yasuda et al.; "Optical noise reduction by reconstructing positive and negative images from Fourier holograms in coaxial holographic storage systems;" *Optics Letter*; Optical Society of America; vol. 31; No. 11; Jun. 1, 2006; pp. 1639-1641.

* cited by examiner

SLM PATTERN

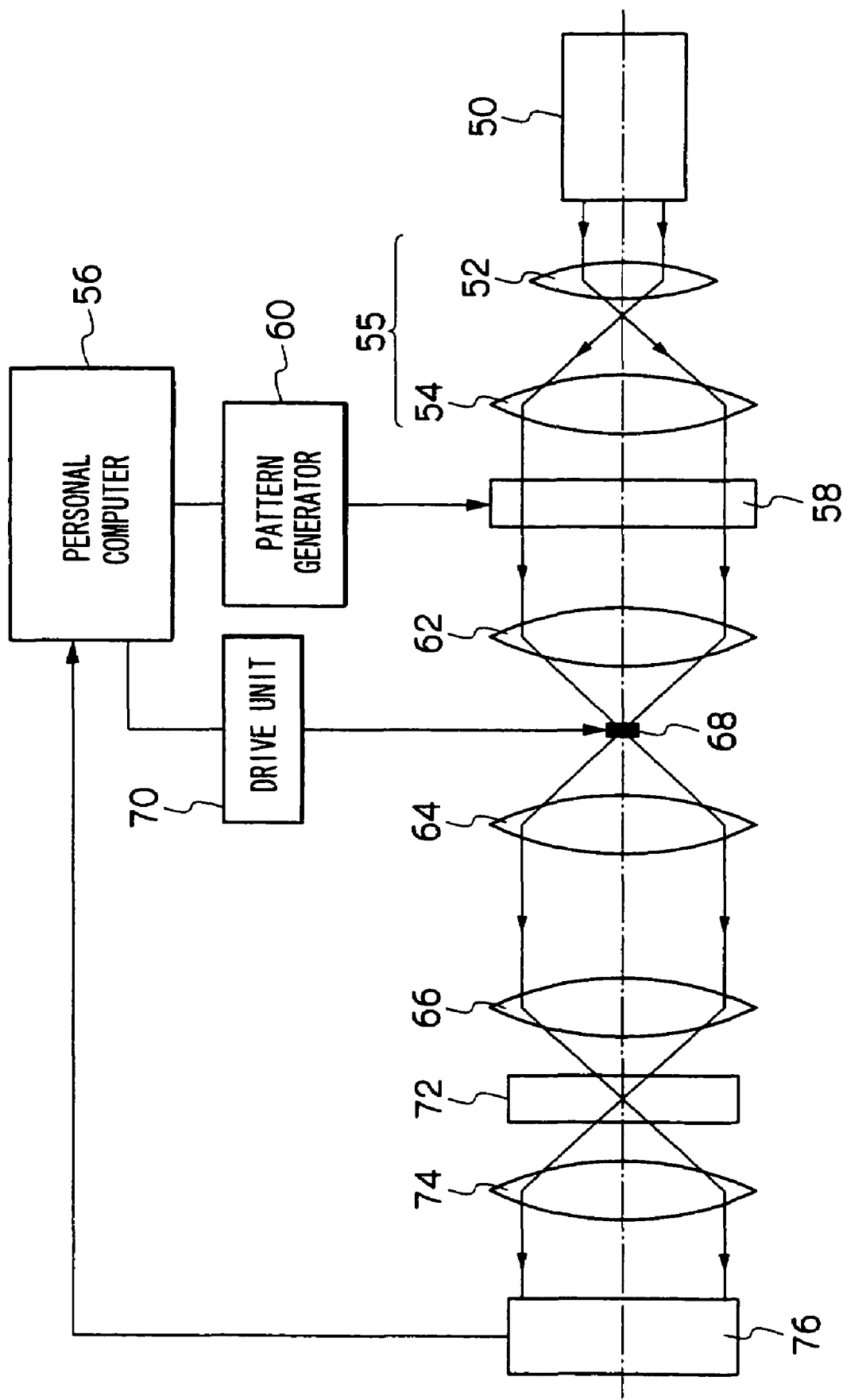

0　　　　　　　1

0　　　　　　　1

0　　　　　　　1

REPRODUCED PAGE 1
(0-ORDER LIGHT IS NOT ADDED)

REPRODUCED PAGE 2
(0-ORDER LIGHT IS ADDED)

F I G. 14
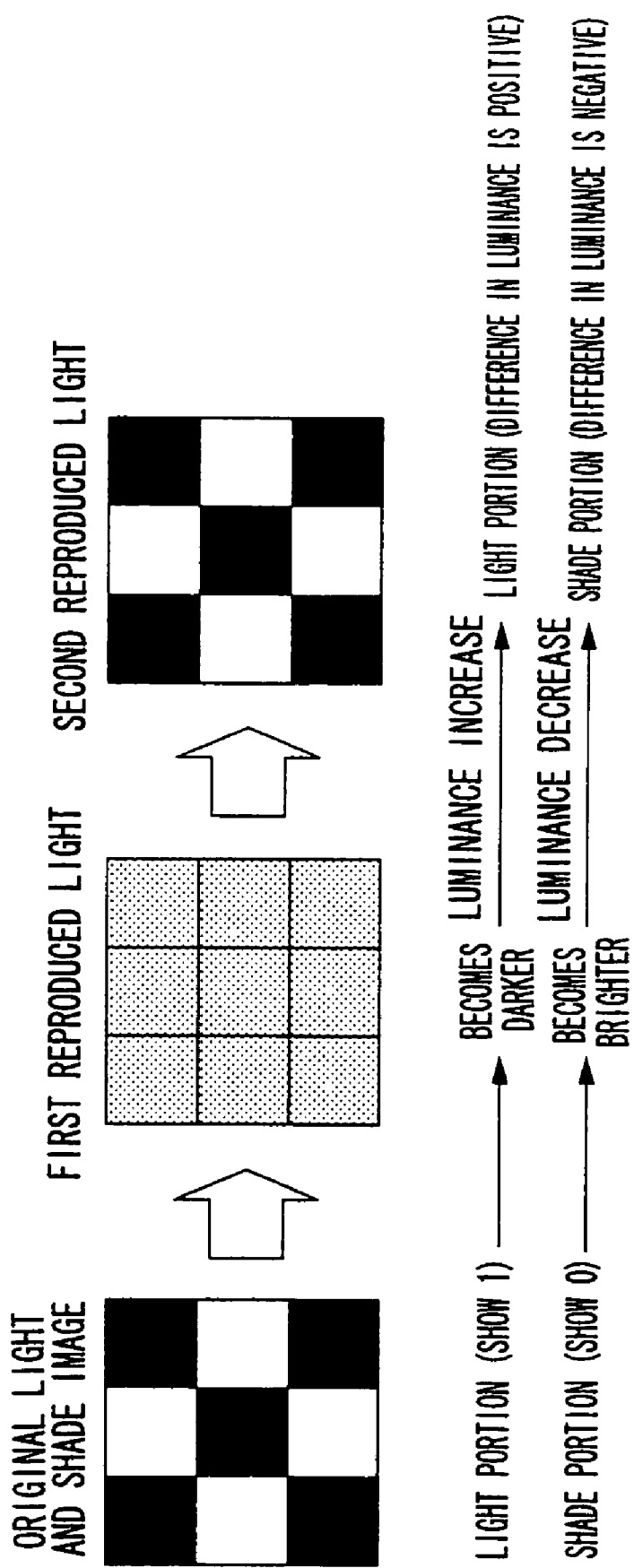

0-ORDER LIGHT RATIO: 0

0-ORDER LIGHT RATIO: 0.2

HOLOGRAM REPRODUCTION METHOD AND APPARATUS

BACKGROUND

1. Technical Field

The present invention relates to a hologram reproduction method and apparatus, and particularly relates to a hologram reproduction method and apparatus that can record a Fourier transformed hologram in a state with a 0-order component removed from a signal light, restore and reproduce the original signal light from the recorded hologram, and reproduce recorded digital data accurately.

2. Related Art

In holographic data storage, digital data "0", "1" is digitally imaged (formed into signal light) as a contrast of "light" and "shade", and the signal light is Fourier-transformed by a lens and irradiated onto an optical recording medium. Accordingly, a Fourier-transformed image is recorded on the optical recording medium as a hologram. The Fourier-transformed image in digital data has quite strong peak intensity in the 0-order component. In the holographic data storage, therefore, a dynamic range of the optical recording medium is consumed by the 0-order component (DC component), and if it is tried to increase the degree of multiplexing (the number of holograms to be multirecorded), an S/N (signal to noise) ratio of the reproduced image is considerably deteriorated, thereby causing a problem in that the degree of multiplexing cannot be increased.

In order to address the above, various methods for intercepting the DC (0-order) component in the Fourier-transformed image of the signal light have been proposed.

However, if the 0-order component is removed from the Fourier-transformed image of the signal light, an intensity pattern different from an original data image appears on a reproduced image, and hence, digital data cannot be decoded accurately. That is, if the 0-order component is removed from the Fourier-transformed image of the signal light to perform record reproduction of the hologram, the intensity pattern of the reproduced image becomes a pattern different from the intensity pattern generated by a spatial light modulator at the time of recording. For example, in the above method, only the image edge portion is reproduced, and hence, the digital data may not be decoded accurately.

SUMMARY

An aspect of the present invention is a hologram reproduction method for reproducing a hologram from an optical recording medium in which the hologram is recorded by Fourier transforming a signal light, in which digital data is represented by an image of intensity distribution, and a reference light, and simultaneously irradiating the lights in a state in which a direct current component is removed from at least the Fourier transformed signal light (i.e., from the Fourier transformed signal light, or from both of the Fourier transformed signal light and the Fourier transformed reference light) onto the optical recording medium, the method including: irradiating a read out reference light onto the optical recording medium, and generating a diffracted light from the recorded hologram; generating all or a part of a direct current component contained in a Fourier transformed image of the signal light; combining the diffracted light and the generated all or a part of the direct current component, and generating a combined beam; and reproducing the signal light by inverse-Fourier transforming the combined beam.

BRIEF DESCRIPTION OF THE DRAWINGS

Exemplary embodiments of the present invention will be described in detail based on the following figures, wherein:

FIG. 6 is a diagram showing a schematic configuration of a hologram recording and reproduction apparatus according to a third and a sixth exemplary embodiment;

FIG. 14 is a diagram for explaining a decoding principle of digital data; and

DETAILED DESCRIPTIONS

Figure 1:
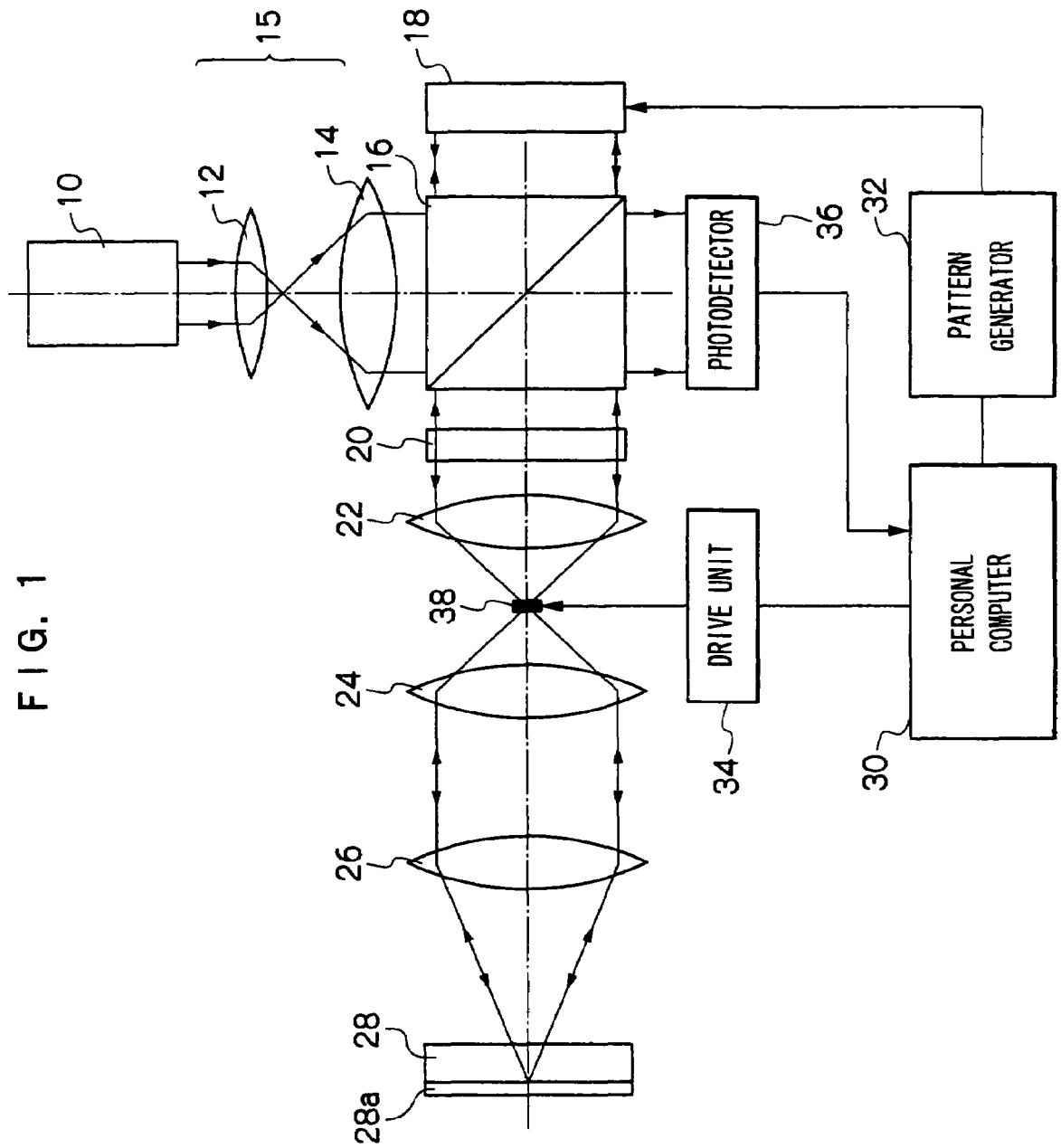
FIG. 1 is a diagram showing a schematic configuration of a hologram recording and reproduction apparatus according to a first and a fifth exemplary embodiment of the present invention.

Exemplary embodiments of the present invention will be explained in detail with reference to drawings.

(Reproduction Principle of Signal Light)

The reproduction principle of signal light will be briefly explained. A situation will be explained in which the signal light (digital pattern), with digital data "0, 1" being digitally imaged as a contrast of "light, shade", is Fourier transformed, the DC (direct current) component (0-order component) is removed from a Fourier transformed image of the signal light, and the signal light whose DC component is removed and reference lights are irradiated onto an optical recording medium simultaneously, to record an interference pattern as a hologram.

When the hologram is recorded by using the signal light whose DC component is removed, diffracted light having the same components as those of the signal light whose DC component is removed is reproduced when the reference lights are irradiated onto the recorded hologram. Therefore, at the time of reproduction of the hologram, the signal light is reproduced by supplementing the removed DC component to the reproduced diffracted light, and the original signal light pattern (digital pattern) can be reproduced from the recorded hologram. As a result, the digital data held by the signal light can be accurately decoded.

The reproduction of the original signal light pattern is realized as a result of interference between the diffracted light from the hologram and the supplemented DC component. The role of the DC (0-order) component is for increasing and decreasing an amplitude value of a combined beam formed by the diffracted light excluding the 0-order component, without changing the shape of the combined beam. For example, when a phase of the DC component is the same as that of the diffracted light, the positive amplitude of the combined beam is increased, and the reproduced image, being an intensity pattern, becomes a positive image the same as the signal light pattern. On the other hand, when the phase of the DC component is opposite to that of the diffracted light, the positive amplitude of the combined beam is decreased, and the reproduced image, being the intensity pattern, becomes a negative image in which the contrast (light and shade) of the signal light pattern is reversed. Therefore, the reproduced image can be made the positive image or the negative image of the original signal pattern, by appropriately selecting a phase difference between the diffracted light and the DC component.

A relation between the phase difference and the reproduced image, and an appropriate phase difference condition will be explained below. The reproduced image from the hologram is detected by a photodetector. A phase at a certain time t at which the amplitude of the diffracted light becomes the maximum at a certain position r on an image plane of the photodetector is assumed to be $\phi$. The amplitude and the phase of the DC component at the time t and at the position r are respectively assumed to be A and $\theta$. In order to obtain a positive image as the reproduced image, the amplitude of the combined beam needs only to be shifted in a positive direction. To perform this, $\theta$ is set so that the amplitude A of the DC component becomes positive, that is, so as to satisfy the following equation (1).

$$0 \leq |\theta - \phi| < \pi/2 \qquad \text{Equation (1)}$$

It is desired to set $\theta$ so as to satisfy the following equation (2). Under this condition, the maximum value of the amplitude of the diffracted light coincides with the maximum value of the amplitude of the DC component, and hence, the positive amplitude of the combined beam becomes the maximum.

$$|\theta - \phi| = 0 \qquad \text{Equation (2)}$$

On the other hand, in order to obtain a negative image as the reproduced image, the amplitude of the combined beam needs only to be shifted in a negative direction. To perform this, $\theta$ is set so that the amplitude A of the DC component becomes negative, that is, so as to satisfy the following equation (3).

$$\pi/2 < |\theta - \phi| \leq \pi \qquad \text{Equation (3)}$$

It is desired to set $\theta$ so as to satisfy the following equation (4). Under this condition, the maximum value of the amplitude of the diffracted light coincides with the minimum value of the amplitude of the DC component, and hence, the negative amplitude of the combined beam becomes the maximum.

$$|\theta - \phi| = \pi \qquad \text{Equation (4)}$$

The phase of the DC component can be set by appropriately changing the luminance of the signal light pixel of a spatial light modulator. The spatial light modulator modulates and emits polarized light of the incident light. The polarization modulation can be performed by phase-modulating the incident light. That is, the phase modulation can be performed by polarization modulation. Moreover, the size of the polarization modulation depends on the luminance of the image to be displayed on the spatial light modulator. Therefore, the phase of the DC component can be set by setting the luminance of the image.

Next a method for setting the phase difference between the diffracted light from the hologram and the DC component will be explained.

The phase of the diffracted light from the recorded hologram deviates from the phase of the reference light at the time of reproduction. The degree of phase change depends on the type of the hologram. For example, in the hologram using refractive index modulation and in the hologram using absorption modulation, the phase of the diffracted lights is deviated by $\pi/2$ and $\pi$, respectively. Therefore, to generate the reproduction image satisfying the equations (1) to (4), the luminance of an image to be displayed on the spatial light modulator needs to be set, taking the phase shift into consideration, to generate and supplement the DC component. As a result, the desired phase difference ($|\theta - \phi|$) can be realized.

For example, in the case of the hologram using the refractive index modulation, the phase of the diffracted light deviates from the reference lights at the time of reproduction by $\pi/2$. On the other hand, since the DC component to be supplemented is not diffracted by the hologram, there is no phase change. Accordingly, the phase difference between the diffracted light from the hologram and the supplemented DC component becomes zero by shifting the phase of the DC component to be supplemented, from the phase of the reference light at the time of reproduction by $\pi/2$. Accordingly, the luminance of the image to be displayed on the spatial light modulator needs to be set so as to realize this phase of the DC component, in order to satisfy the relationship in equation (2) and to maximize the positive amplitude of the combined beam. Specifically, the relation between the phase modulation amount of the DC component and the luminance of the display image is prestored, and based on this relation, the luminance of the display image can be set so that the desired phase modulation amount can be achieved.

(Decoding Principle of Digital Data)

A decoding principle of the digital data will be explained in more detail with reference to FIG. 14.

When the hologram is recorded by using the signal light whose DC component is removed, diffracted light having the same components as those of the signal light whose DC component is removed is reproduced when the reference lights are irradiated onto the recorded hologram. In an inverse-Fourier transformed image (first reproduced image) of the diffracted light, the light portion of an original contrast image (an image expressed by intensity distribution) tends to become dark, and the shade portion thereof tends to become bright. As a result, the contrast (or the S/N ratio) of white pixels and black pixels tends to deteriorate. The reason why the contrast deteriorates in the first reproduced image can be explained as follows.

That is, removal of the DC component means that a plane wave having a total intensity equal to the signal light and having the phase difference π is made to interfere with the signal light. For example, in the case of the plane wave in which the entire signal light is formed of the DC component, if the plane wave having the phase difference π is made to interfere with the signal light with the same intensity, the signal light becomes zero. Therefore when the DC component in the signal light modulated by the digital data is removed, the same result can be obtained as a case in which a plane wave having the same total intensity and a phase difference 7 is made to interfere with the original signal light.

In this case, in a bright portion, since the amplitude of an electric field decreases due to a negative interference, the intensity decreases and the bright portion becomes darker. On the other hand, since a light wave is added to a dark portion to increase the amplitude of the electric field, the intensity becomes large and the dark portion becomes brighter. As a result, the intensity of the bright portion and the dark portion becomes substantially the same, and the contrast deteriorates.

The above explanation of contrast deterioration is for a case in which the number of white pixels and the number of black pixels in a digital pattern of the signal light are substantially the same. Generally, in a digital pattern, the number of white pixels and the number of black pixels are substantially the same. When the number of white pixels is considerably larger than the number of black pixels, as described below, the first reproduced image becomes a reverse image in which contrast in the digital pattern of the signal light are reversed. However, it has the same tendency as described above in that the light portion in the original image of intensity distribution becomes darker and the dark portion becomes brighter.

When the DC component of the same phase is supplemented to the reproduced diffracted light, combined beams similar to the original signal light are generated. In other words, when the phase of the DC component to be supplemented is the same as that of the diffracted light from the hologram, a second reproduced image becomes a positive image having the same contrast as the original signal light. In the inverse-Fourier transformed image (second reproduced image) of the combined beams, the bright portion of the original image of intensity distribution becomes brighter and the shade portion becomes darker. Accordingly, a difference obtained by subtracting the luminance of the first reproduced image from the luminance of the second reproduced image becomes positive in the bright portion of the original image of intensity distribution, and negative in the dark portion thereof.

As described above, for example, if digital data "0, 1" is defined as "shade (black pixel), light (white pixel)", signs of respective pixels can be accurately determined according to a positive or negative difference, in that a pixel having a positive difference is "1" and a pixel having a negative difference is "0", thereby enabling accurate reproduction of the digital data.

On the other hand, when the phase of the DC component to be supplemented is opposite to that of the diffracted light from the hologram, the second reproduced image becomes a reverse image (negative image) in which contrast of the original signal light are reversed. In this case, a difference obtained by subtracting the luminance of the abovementioned positive image obtained by supplementing the DC component of the same phase to the reproduced diffracted light from the luminance of the second reproduced image becomes negative in the bright portion of the original image of intensity distribution, and positive in the dark portion thereof.

As in the above example, if digital data "0, 1" is defined as "shade (black pixel), light (white pixel)", signs of respective pixels can be accurately determined according to a positive or negative difference, in that a pixel having a negative difference is "1" and a pixel having a positive difference is "0", thereby enabling accurate reproduction of the digital data.

Next is a description of a method and effect of performing a decoding processing by using an image obtained by subtracting one from the other of two types of reproduced images (negative image and positive image). Normally, the reproduced image is affected by noise light caused by recoding media or an optical system at the time of reading, and S/N ratio deteriorates. As a result, the negative image and the positive image become images including signal components and noise components, and the difference in brightness of white pixel and black pixel (difference in luminance) decreases. This phenomenon becomes remarkable as the multiplicity increases in multirecording. Consequently, if there are a lot of noise components, when decoding processing is performed by using any one of the negative image and the positive image, bit errors are increased, making it difficult to accurately reproduce the recorded data.

With respect to this, if the luminance of the first reproduced image (negative image) is subtracted from the second reproduced image (positive image), the third reproduced image obtained by the subtraction becomes an image with a large contrast having an improved S/N ratio. The reason why the S/N ratio is improved is that, since the first reproduced image and the second reproduced image reproduced from the same hologram contain common noise components, then by subtracting the luminance of the first reproduced image from the luminance of the second reproduced image, the common noise component is cancelled. By performing decoding processing using these images for which the S/N ratio has been improved, then as mentioned above, the signs of respective pixels can be accurately determined according to a positive or negative difference, thereby enabling accurate reproduction of the digital data.

Moreover, in the method described above, the luminance of the negative image may be subtracted from the luminance of the positive image. Conversely, even if the luminance of the positive image is subtracted from the luminance of the negative image, the same decoding processing can be performed.

Figure 15A:
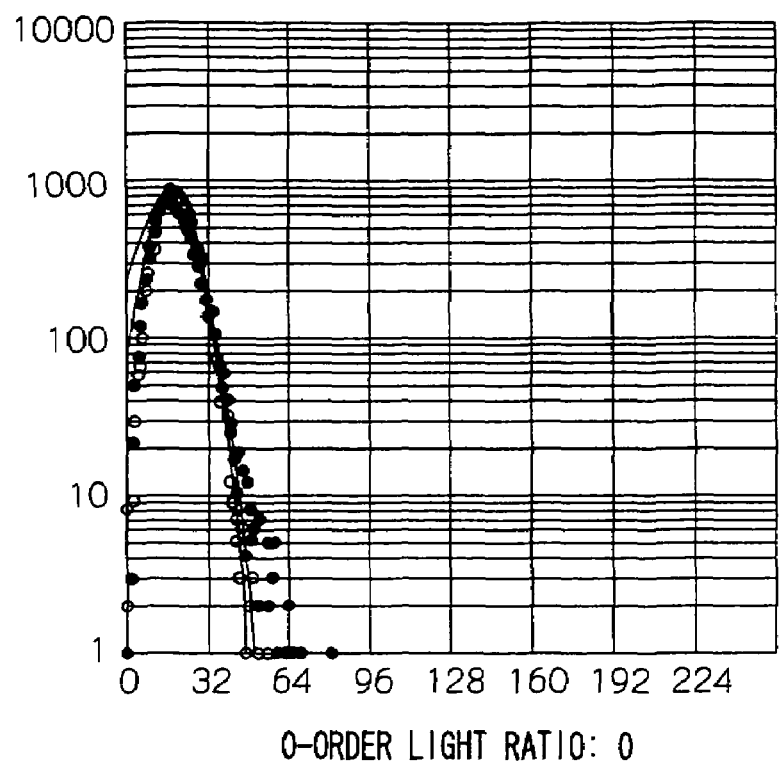
FIGS. 15A and 15B are graphs showing results of computer experiments.
Figure 15B:
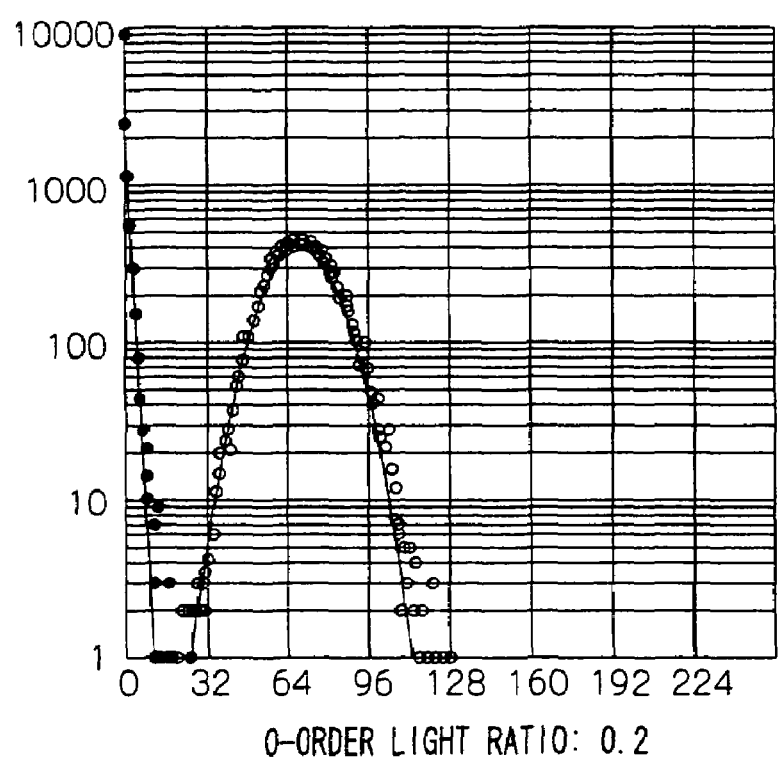

FIGS. 15A and 15B are graphs showing the results of computer experiments. The X axis denotes a luminance value expressed by 256 gradations, and the Y axis denotes the detection frequency of pixels. Black spots plot black pixels, and white spots plot white pixels.

In the computer experiments, a data image of the signal light was created as described below. That is, digital data "0, 1" was assumed to be black pixels (luminance 0), and white pixels (luminance 255). Moreover, in order to add the intensity distribution of irradiated light and the influence of noise to the entire data image, distribution of the black pixels was assumed to have an average luminance 10 and distribution 10, and distribution of the white pixels was assumed to have an average luminance 220 and distribution 10. Simulation was carried out by using this data image, the signal light (data image) was subjected to Fourier transform, and the intensity of the DC component (0-order component) of the Fourier-transformed image of the signal light was modulated, to perform inverse Fourier transform.

A histogram of the Fourier-transformed image was created and evaluated. Here, the intensity modulation of the 0-order component corresponds to changing the ratio of the 0-order component supplemented at the time of reproduction to the 0-order component included in the original signal light.

Moreover, the inverse-Fourier transformed image corresponds to a reproduced image from the hologram. In the computer experiments, the diffracted light from the hologram and the supplemented 0-order component have the same phase. Accordingly, the second reproduced image becomes a positive image having the same contrast as that of the original signal.

As seen from the experiment results, when the 0-order component is added (0-order light ratio: 0.2, FIG. 15B), the luminance of the black pixels decreases, and the luminance of the white pixels increases, to increase the contrast, as compared to a case in which the 0-order component is removed (0-order light ratio: 0, FIG. 15A). That is, by removing or adding the 0-order component, the luminance distribution of the reproduced image from the hologram can be controlled. Accordingly, as described above, the digital data can be accurately reproduced by using the two reproduced images having a different 0-order component ratio to subtract a luminance of the two reproduced images.

First Exemplary Embodiment

FIG. 1 is a diagram showing a schematic configuration of a hologram recording and reproduction apparatus according to a first exemplary embodiment. As shown in the figure, in the recording and reproduction apparatus, signal light and reference light can be irradiated to the optical recording medium coaxially.

The hologram recording and reproduction apparatus includes a light source 10 which oscillates laser beams, being coherent light. A beam expander 15 formed of lenses 12 and 14 is arranged on a laser beam irradiation side of the light source 10. A polarization beam splitter 16 which transmits only the polarized light in a predetermined direction and reflects the other light is arranged on a light transmission side of the beam expander 15. Hereinafter, explanation is given, assuming that the polarization beam splitter 16 transmits P-polarized light, and reflects S-polarized light.

A reflection type spatial light modulator 18 is arranged on a light reflecting side of the polarization beam splitter 16. The spatial light modulator 18 is connected to a personal computer 30 via a pattern generator 32. The pattern generator 32 generates a pattern to be displayed on the spatial light modulator 18 according to digital data supplied from the personal computer 30. The spatial light modulator 18 modulates the incident laser beams according to the display pattern, to generate a digital image (signal light) and a reference light for each page. The generated signal light and the reference light are reflected toward the polarization beam splitter 16, and pass through the polarization beam splitter 16.

A ¼ wave plate 20, lenses 22 and 24, and a Fourier transform lens 26 are arranged in this order along an optical path on a signal light transmission side of the polarization beam splitter 16. A mask 38 is arranged between the lenses 22 and 24 so that it can be inserted and withdrawn with respect to the optical path. The mask 38 removes the DC component from the Fourier transformed image of the signal light and the reference light. Moreover, the mask 38 is connected to the personal computer 30 via a drive unit 34 which drives the mask 38.

For the mask 38, for example, a minute mirror or the like which reflects only the DC component in the Fourier transformed image can be used. A situation in which the minute mirror is used for the mask 38 will be explained below.

When the reference light is irradiated on an optical recording medium 28 at the time of hologram reproduction, the irradiated reference light is diffracted by the hologram, and the diffracted light is reflected by a reflecting layer 28a in the optical recording medium 28 toward the Fourier transform lens 26. The reflected diffracted light enters into the polarization beam splitter 16. A photodetector 36 is arranged on the diffracted light-reflecting side of the polarization beam splitter 16. The photodetector 36 includes an image pick-up device such as a CCD or a CMOS array, and converts the reproduced light (diffracted light) received into an electric signal and outputs the electric signal. Moreover the photodetector 36 is connected to the personal computer 30.

Figure 2:
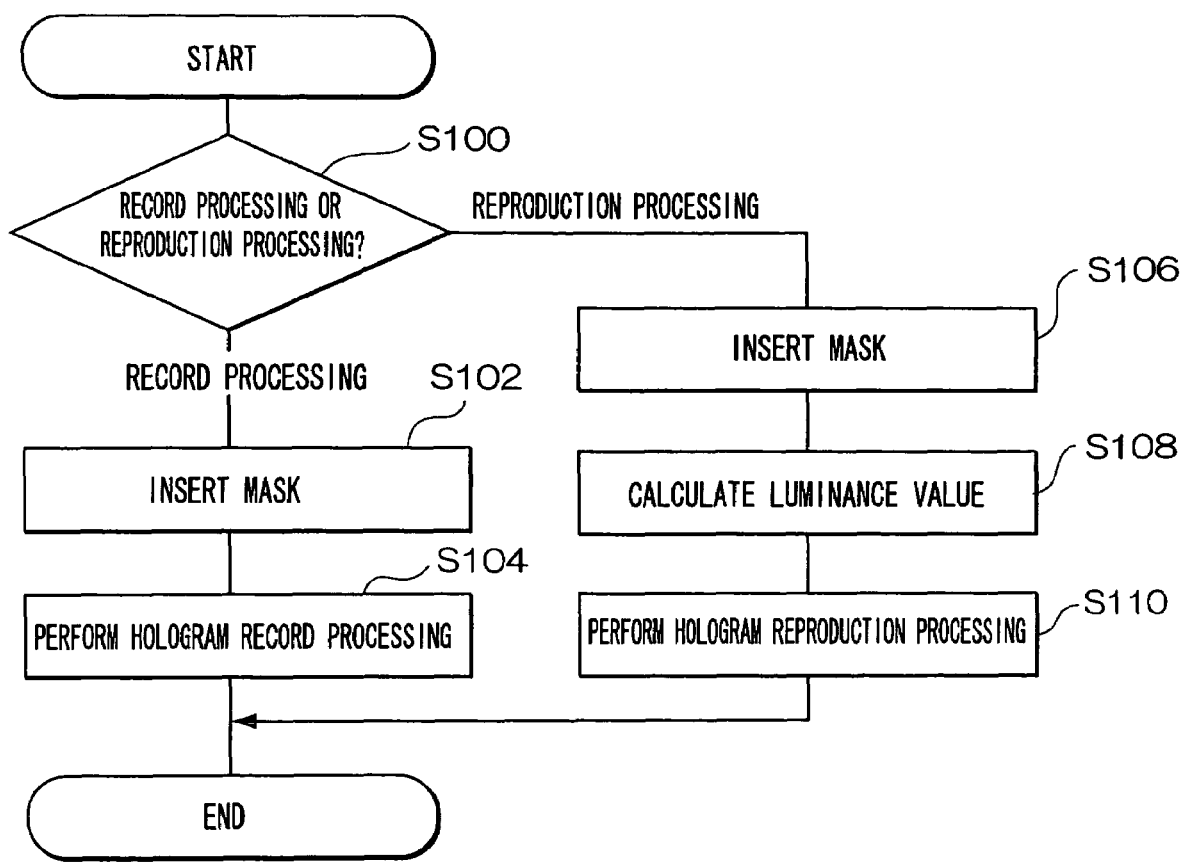
FIG. 2 is a flowchart showing a processing routine of record/reproduction processing in the first exemplary embodiment.

A processing routine of the record/reproduction processing executed by the personal computer 30 will be explained next. FIG. 2 is a flowchart showing the processing routine of the record/reproduction processing. A user first operates an input device (not shown) connected to the personal computer 30, to select record processing or reproduction processing. When the digital data is to be recorded as the hologram, the digital data to be recorded is input to the personal computer beforehand.

At step 100, it is determined which one of the record processing and the reproduction processing is selected. When the record processing is selected, at step 102, the drive unit 34 is driven and the mask 38 is inserted into the optical path. At the next step 104, the laser beams are irradiated from the light source 10, and digital data is output from the personal computer 30 at a predetermined timing, and the record processing of the hologram is executed, to finish the routine.

The record processing of the hologram will be explained here.

The laser beams oscillated from the light source 10 are collimated to beams having a large diameter by the beam expander 15, enter into the polarization beam splitter 16, and are reflected toward the spatial light modulator 18. When the digital data is input from the personal computer 30, a signal light pattern is generated according to the supplied digital data by the pattern generator 32. The generated signal light pattern is combined with the reference light pattern, to generate a pattern to be displayed on the spatial light modulator 18. The spatial light modulator 18 polarizes and modulates the laser beams according to the displayed pattern, to generate the signal light and the reference light.

Figure 3:
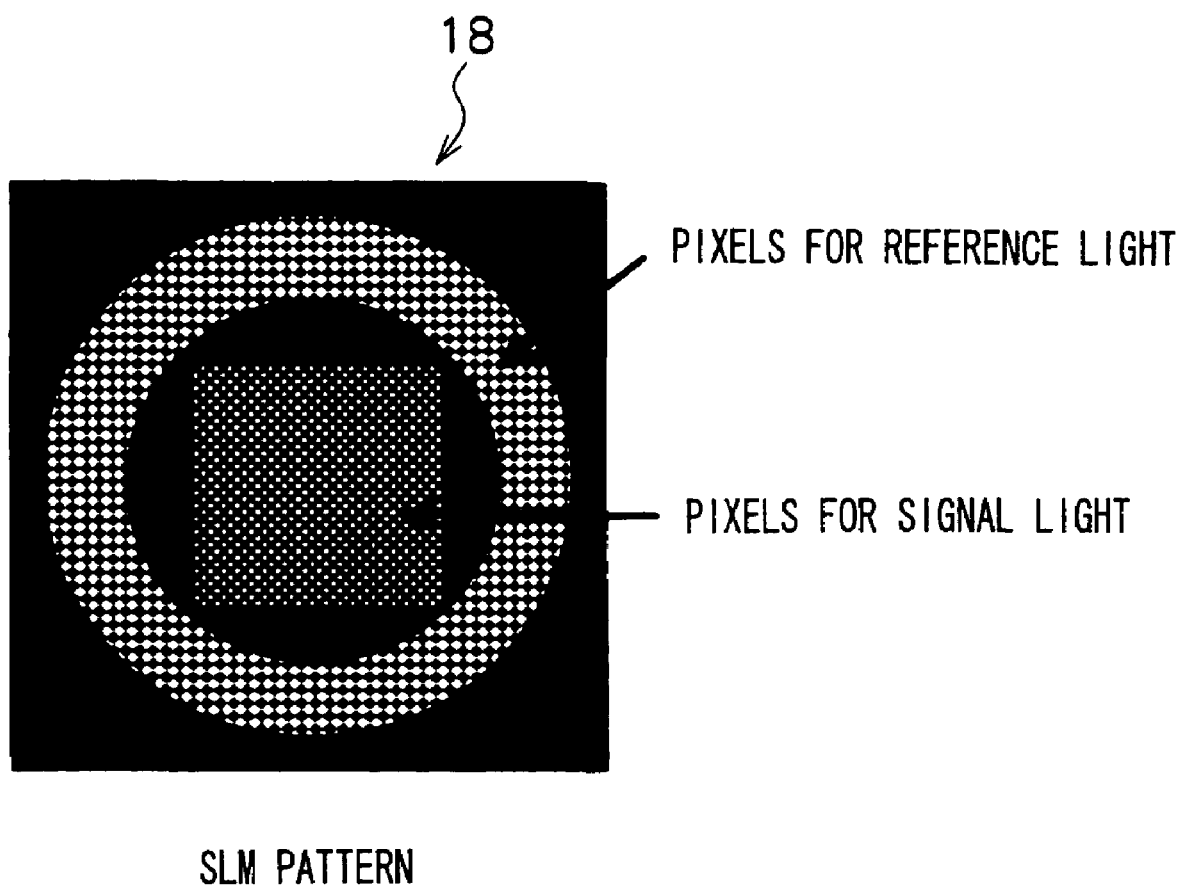
FIG. 3 is a diagram showing a display image of a spatial light modulator at the time of record processing.

For example, as shown in FIG. 3, the central part of the spatial light modulator 18 is used for data display (for the signal light), and the peripheral part thereof is used for the reference light. The laser beams entering into the central part of the spatial light modulator 18 are polarized and modulated according to the display pattern, to generate the signal light. On the other hand, the laser beams entering into the peripheral part of the spatial light modulator 18 are polarized and modulated according to the display pattern, to generate the reference light.

The signal light and the reference light polarized and modulated by the spatial light modulator 18 are irradiated to the polarization beam splitter 16, transmitted through the polarization beam splitter 16, and are converted to an amplitude distribution of linearly polarized light (P-polarized light). Thereafter, the linearly polarized light is converted to circularly polarized light by the ¼ wave plate 20, and Fourier-transformed by the lens 22. The Fourier-transformed signal light and reference light are irradiated to the mask 38, and the DC component is removed from the Fourier-transformed image of the signal light and the reference light.

The signal light and the reference light not blocked by the mask 38 are inverse-Fourier transformed by the lens 24, Fourier-transformed again by the lens 26, and irradiated to the optical recording medium 28 simultaneously and coaxially. As a result, the signal light and the reference light interfere with each other in the optical recording medium 28, and an interference pattern is recorded as the hologram.

When the reproduction processing is selected at step 100, then at step 106, the drive unit 34 is driven to insert the mask 38 into the optical path. At the next step 108, a luminance value of the display image for supplementing the DC component to the reproduced diffracted light is calculated. At step 110, the laser beams are irradiated from the light source 10, and a calculated luminance value is output from the personal computer 30 at a predetermined timing, and the reproduction processing of the hologram is executed, to finish the routine.

As described above, reproduction of the original signal light pattern is realized as a result of interference between the diffracted light from the hologram and the supplemented DC component. In other words, the original signal light pattern is reproduced by setting a phase difference between the diffracted light and the DC component so as to increase the amplitude of an interfacial wave (the combined beams). The phase of the DC component can be set by appropriately changing the luminance of the pixels for the signal light of the spatial light modulator.

Figure 4:
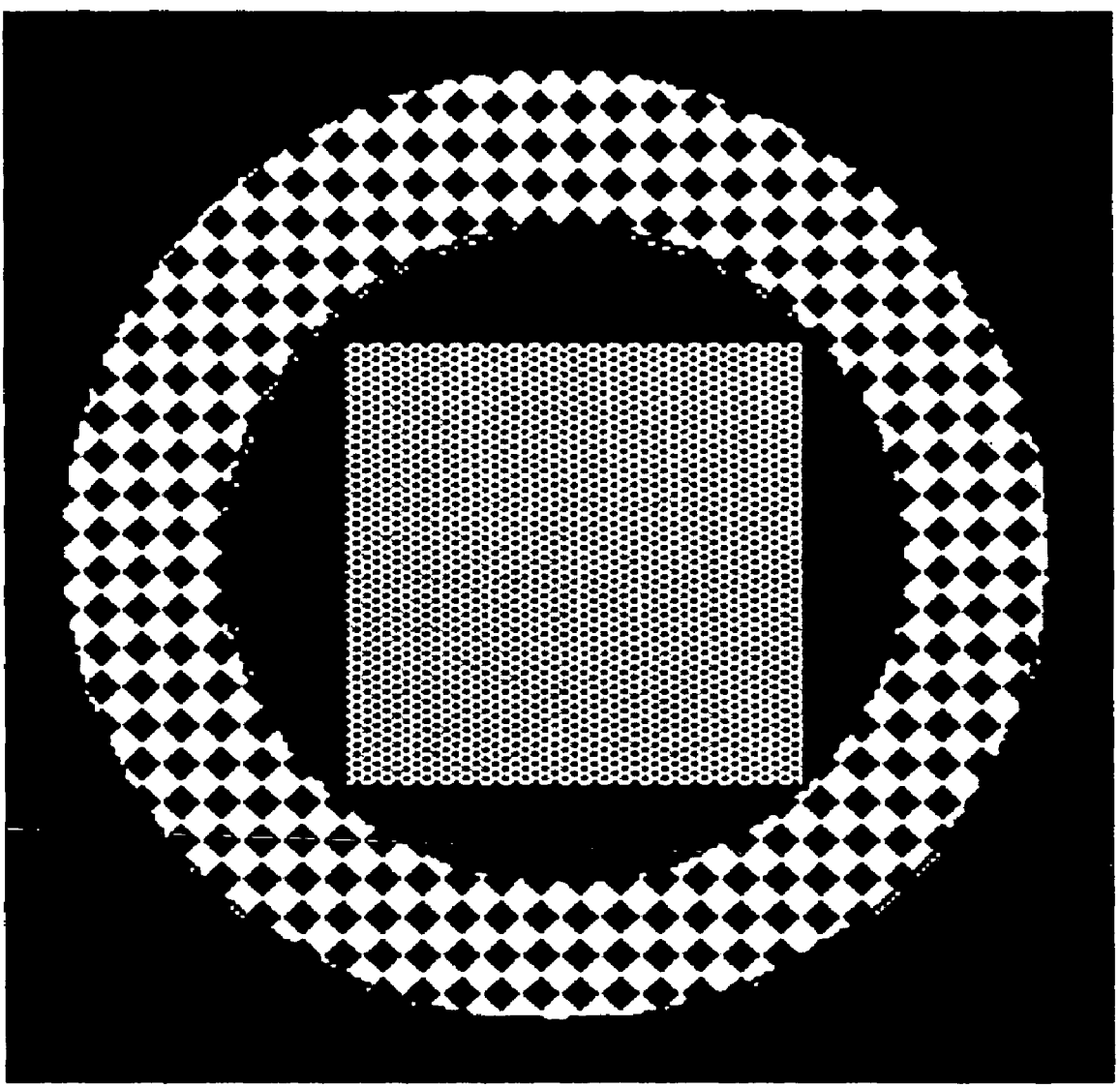
FIG. 4 is a diagram showing a display image of the spatial light modulator at the time of reproduction processing.

As shown in FIG. 4, a transmission pattern (pixels having the same luminance other than 0) is displayed on the central part of the spatial light modulator 18, and the reference light pattern the same as that of at the time of recording is displayed on the peripheral part of the spatial light modulator 18. Accordingly, the laser beams entering to the central part of the spatial light modulator 18 pass through the polarization beam splitter 16, to generate the DC component of the signal light. As explained for the reproduction principle of the signal light, the original signal light pattern is reproduced by setting the luminance of the respective pixels in the transmission pattern so as to increase the amplitude of the interfacial wave between the generated DC component and the diffracted light. On the other hand, the laser beams entering to the peripheral part of the spatial light modulator 18 are polarized and modulated according to the display pattern, to generate the reference light.

Calculation of the luminance value of the transmission pattern is performed according to the procedure described below.

As described above, the phase of the diffracted light from the hologram deviates from the phase of the reference light at the time of reproduction. The deviation amount depends on the type of the hologram. Since the type of the hologram is known according to the recording material to be used, the deviation amount is known. The luminance of the pixels in the spatial light modulator 18 and the phase modulation amount to be generated are also known. Consequently, the luminance value of the transmission pattern is set so that a difference between the deviation amount of the phase of the diffracted light and the phase modulation amount to be added to the supplemented DC component satisfies the above equation (2).

However, depending on the specification of the spatial light modulator, there may be a case in which a desired phase modulation amount cannot be added to the DC component. In this case, the luminance value of the transmission pattern is set so as to satisfy the above equation (4). As the reproduced image in this case, a reverse image is obtained in which contrast in the original signal light pattern is reversed. When the condition in equation (4) cannot be satisfied as well, the luminance value of the transmission pattern is set so as to satisfy the above equation (1) or (3).

The reproduction processing of the hologram will be explained here.

The laser beams oscillated from the light source 10 are collimated to beams having a large diameter by the beam expander 15, enter into the polarization beam splitter 16, and are reflected toward the spatial light modulator 18. When the calculated luminance value from the personal computer 30 is input, the pattern generator 32 generates a transmission pattern according to the supplied luminance value. The generated transmission pattern is combined with the reference light pattern, to generate a display pattern to be displayed on the spatial light modulator 18. The spatial light modulator 18 transmits the laser beams according to the transmission pattern to generate the DC component of the signal light, while polarizing and modulating the laser beams according to the reference light pattern to generate the reference light.

The reference light generated in the spatial light modulator 18 is irradiated to the polarization beam splitter 16, transmitted through the polarization beam splitter 16, and converted to an amplitude distribution of linearly polarized light (P-polarized light). Thereafter, the linearly polarized light is converted to circularly polarized light by the ¼ wave plate 20, and Fourier-transformed by the lens 22. The Fourier-transformed reference light is irradiated to the mask 38. The reference light not blocked by the mask 38 is inverse-Fourier transformed by the lens 24, Fourier-transformed again by the lens 26, and irradiated to an area of the optical recording medium 28 where the hologram is recorded.

The irradiated reference light is diffracted by the hologram, and the diffracted light is reflected toward the lens 26 by the reflecting layer 28a in the optical recording medium 28. The reflected diffracted light is inverse-Fourier transformed by the lens 26, relayed by the lenses 24 and 22, converted to S-polarized light by the ¼ wave plate 20, enters into the polarization beam splitter 16, and is reflected toward the photodetector 36.

On the other hand, the DC component of the signal light generated in the spatial light modulator 18 is irradiated to the polarization beam splitter 16, transmitted through the polarization beam splitter 16, converted to the circularly polarized light by the ¼ wave plate 20, and Fourier-transformed (focused) by the lens 22. The focused DC component is reflected toward the lens 22 by the mask 38, being the minute mirror. The DC component reflected by the mask 38 is collimated by the lens 22, converted to S-polarized light by the ¼ wave plate 20, enters into the polarization beam splitter 16, and is reflected toward the photodetector 36.

The diffracted light diffracted by the hologram and the DC component of the signal light enter into the photodetector 36. The reproduced image can be observed on a focal plane of the lens 22. In this exemplary embodiment, since the DC component of the signal light removed at the time of recording of the hologram is supplemented to the diffracted light, the diffracted light having the same component as that of the original signal light is reproduced, and the original signal light pattern (image of intensity distribution) is reproduced. The reproduced image is detected by the photodetector 36. The detected analog data is A/D converted by the photodetector 36, and the image data of the reproduced image is input to the personal computer 30.

As described above, in this exemplary embodiment, the hologram is recorded in a state with the DC component removed from the Fourier-transformed image of the signal light. Accordingly, unnecessary exposure by the DC component of the signal light is prevented at the time of recording of the hologram, and the dynamic range can be effectively used, thereby improving the degree of multiplexing.

Further, in this exemplary embodiment, the DC component of the signal light removed at the time of recording is supplemented to the diffracted light obtained from the recorded hologram at the time of reproduction of the hologram. Accordingly, the diffracted light having the same component as that of the original signal light is reproduced, and the original signal light pattern (image of intensity distribution) is reproduced. As a result, the digital data held by the signal light can be accurately decoded.

In the above configuration, the mask 38, being the minute mirror, is movably arranged. However, the configuration is not limited as such and the mask may be fixedly arranged. When the mask is fixedly arranged, the drive unit for driving the mask is not required, and hence, the configuration of the hologram recording and reproduction apparatus can be simplified.

Second Exemplary Embodiment

In the second exemplary embodiment, an example is described for where a hologram recording and reproduction apparatus the same as for the first exemplary embodiment is used, and at the time of reproduction of the hologram, the DC component of the signal light generated by a spatial light modulator is reflected by the reflecting layer of the optical recording medium, and is input to a photodetector. Since only the method for the hologram reproduction processing is different and the other is the same as for the first exemplary embodiment, description of the hologram recording is omitted.

For the mask used in this exemplary embodiment, any type can be used provided it can blocked off only the DC component of the Fourier transformed image. For example a minute mirror having a reflection function, or a photoabsorption type filter can be used.

Figure 5:
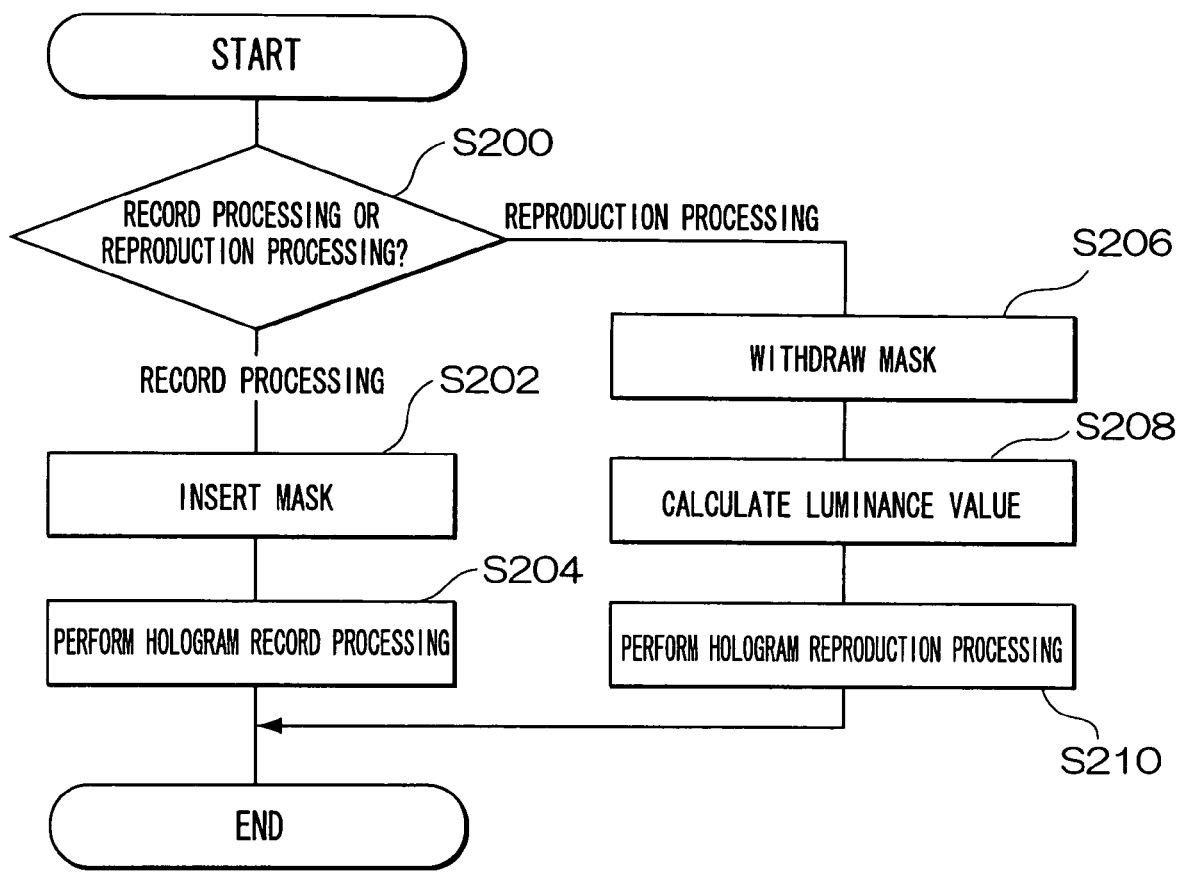
FIG. 5 is a flowchart showing a processing routine of record/reproduction processing in a second exemplary embodiment.

FIG. 5 is a flowchart showing a processing routine of record/reproduction processing.

At step 200, it is determined which one of the record processing and the reproduction processing is selected. When the record processing is selected, at step 202, the drive unit 34 is driven and the mask 38 is inserted into the optical path. At the next step 204, the laser beams are irradiated from the light source 10, and digital data is output from the personal computer 30 at a predetermined timing, and the record processing of the hologram is executed, to finish the routine. The method for record processing of the hologram is the same as for the first exemplary embodiment, and hence description is omitted.

When the reproduction processing is selected at step 200, then at step 206, the drive unit 34 is driven to withdraw the mask 38 from the optical path. At the next step 208, a luminance value of the display image for supplementing the DC component to the reproduced diffracted light is calculated. At step 210, the laser beams are irradiated from the light source 10, and a calculated luminance value is output from the personal computer 30 at a predetermined timing, and the reproduction processing of the hologram is executed, to finish the routine.

The method for supplementing the DC component (method of calculating the luminance value of the transmission pattern) is as described for the first exemplary embodiment, and hence description is omitted.

The reproduction processing of the hologram will be explained here.

The laser beams oscillated from the light source 10 are collimated to beams having a large diameter by the beam expander 15, enter into the polarization beam splitter 16, and are reflected toward the spatial light modulator 18. When the calculated luminance value from the personal computer 30 is input, the pattern generator 32 generates a transmission pattern according to the supplied luminance value. The generated transmission pattern is combined with the reference light pattern, to generate a display pattern to be displayed on the spatial light modulator 18.

Similarly to the first exemplary embodiment, a transmission pattern (pixels having the same luminance other than 0) is displayed on the central part of the spatial light modulator 18, and the reference light pattern the same as that of at the time of recording is displayed on the peripheral part of the spatial light modulator 18 (refer to FIG. 4). Accordingly, the laser beams entering to the central part of the spatial light modulator 18 pass through the polarization beam splitter 16, to generate the DC component of the signal light. On the other hand, the laser beams entering to the peripheral part of the spatial light modulator 18 are polarized and modulated according to the display pattern, to generate the reference light. Then this is converted to an amplitude distribution of linearly polarized light by transmitting through the polarization beam splitter 16.

The DC component of the signal light and the reference light generated in the spatial light modulator 18 are irradiated to the polarization beam splitter 16, transmitted through the polarization beam splitter 16, converted to circularly polarized light by the ¼ wave plate 20, and Fourier-transformed by the lens 22. The Fourier-transformed DC component of the signal light and the reference light are inverse-Fourier transformed by the lens 24, Fourier-transformed again by the lens 26, and irradiated to an area of the optical recording medium 28 where the hologram is recorded.

The reference light irradiated onto the optical recording medium 28 is diffracted by the hologram, and the diffracted light is reflected toward the lens 26 by the reflecting layer 28a in the optical recording medium 28. The reflected diffracted light is inverse-Fourier transformed by the lens 26, relayed by the lenses 24 and 22, converted to S-polarized light by the ¼ wave plate 20, enters into the polarization beam splitter 16, and is reflected toward the photodetector 36.

On the other hand, the DC component of the signal light irradiated onto the optical recording medium 28 is reflected toward the lens 26 by the reflecting layer 28a in the optical recording medium 28. The DC component of the reflected signal light is collimated by the lens 26, relayed by the lenses 24 and 22, converted to S-polarized light by the ¼ wave plate 20, enters into the polarization beam splitter 16, and is reflected toward the photodetector 36.

The diffracted light diffracted by the hologram and the DC component of the signal light enter into the photodetector 36. The reproduced image can be observed on a focal plane of the lens 22. In the second exemplary embodiment, the DC component of the signal light removed at the time of recording of the hologram is supplemented to the diffracted light. Therefore, the diffracted light having the same component as that of the original signal light is reproduced, and the original signal light pattern (image of intensity distribution) is reproduced. The reproduced image is detected by the photodetector 36. The detected analog data is A/D converted by the photodetector 36, and the image data of the reproduced image is input to the personal computer 30.

As described above, in this exemplary embodiment, the hologram is recorded in a state with the DC component removed from the Fourier-transformed image of the signal light. Accordingly, unnecessary exposure by the DC component of the signal light is prevented at the time of recording of the hologram, and the dynamic range can be effectively used, thereby improving the degree of multiplexing.

In the exemplary embodiment, the DC component of the signal light removed at the time of recording is supplemented to the diffracted light obtained from the recorded hologram at the time of reproduction of the hologram. Accordingly, the diffracted light having the same component as that of the original signal light is reproduced, and the original signal light pattern (image of intensity distribution) is reproduced. As a result, the digital data held by the signal light can be accurately decoded.

In addition, in the reproduction method of the second exemplary embodiment, similar to the first exemplary embodiment, the DC component to be supplemented must be propagated at high accuracy on the same axis as that of the diffracted light from the hologram. Describing this with reference to FIG. 1, in the first exemplary embodiment, in order to realize this, it is necessary to align both the mask 38 having a reflecting function and the optical recording medium 28. That is, the DC component is reflected by the mask 38, and the diffracted light is reflected by the reflecting layer 28a in the optical recording medium 28. On the other hand in this exemplary embodiment, the DC component to be supplemented and the diffracted light are both reflected by the same reflecting layer 28a. Therefore, only the optical recording medium 28 need be aligned.

Third Exemplary Embodiment

In the first exemplary embodiment, a recording and reproduction apparatus which uses a reflection type spatial light modulator and a reflection type optical recording medium apparatus is described. In the third exemplary embodiment, a recording and reproduction apparatus which uses a transmission type spatial light modulator and a transmission type optical recording medium is described. The point that signal light and reference light can be irradiated to the optical recording medium coaxially, is the same as for the first exemplary embodiment.

FIG. 6 is a diagram showing a schematic configuration of a hologram recording and reproduction apparatus according to the third exemplary embodiment.

The hologram recording and reproduction apparatus includes a light source 50 which oscillates laser beams, being coherent light. A beam expander 55 formed of lenses 52 and 54 is arranged on a laser beam irradiation side of the light source 50. A transmission type spatial light modulator 58 is arranged on a light transmission side of the beam expander 55. The spatial light modulator 58 is connected to a personal computer 56 via a pattern generator 60.

The pattern generator 60 generates a pattern to be displayed on the spatial light modulator 58 according to digital data supplied from the personal computer 56. The spatial light modulator 58 modulates the incident laser beams according to the display pattern, to generate a digital image (signal light) and a reference light for each page.

A polarizing plate (not shown in the figure), lenses 62 and 64, and a Fourier transform lens 66 which irradiates signal light and reference light onto an optical recording medium 72, are arranged in this order along an optical path on a light transmission side of the spatial light modulator 58. A mask 68 is arranged between the lenses 62 and 64 so that it can be inserted and withdrawn with respect to the optical path. The mask 68 removes the DC component from the Fourier transformed image of the signal light and the reference light. Moreover, the mask 68 is connected to the personal computer 56 via a drive unit 70 which drives the mask 68.

For the mask 68, for example, a minute mirror or the like which reflects only the DC component in the Fourier transformed image can be used. Moreover, a filter or the like which absorbs only the DC component in the Fourier transformed image can be used.

When the reference light is irradiated on an optical recording medium 72 at the time of hologram reproduction, the irradiated reference light is diffracted by the hologram, and the diffracted light is transmitted through the optical recording medium 72. A Fourier transform lens 74 and a photodetector 76 are arranged on the diffracted light-transmitting side of the optical recording medium 72. The photodetector 76 includes an image pick-up device such as a CCD or a CMOS array, and converts the reproduced light (diffracted light) received, into an electric signal and outputs the electric signal. Moreover the photodetector 76 is connected to the personal computer 56.

In the hologram recording and reproduction apparatus according to the third exemplary embodiment, the configuration is different to that of the apparatus according to the second exemplary embodiment, and hence the hologram recording method and the reproduction method are different. However the processing routine of the record reproduction processing executed by the personal computer 56 conform to the routine shown in FIG. 5.

At first, at step 200, it is determined which one of the record processing and the reproduction processing is selected. When the record processing is selected, at step 202, the drive unit 70 is driven and the mask 68 is inserted into the optical path. At the next step 204, the laser beams are irradiated from the light source 50, and digital data is output from the personal computer 56 at a predetermined timing, and the record processing of the hologram is executed, to finish the routine.

On the other hand, when the reproduction processing is selected at step 200, then at step 206, the drive unit 70 is driven to withdraw the mask 68 from the optical path. At the next step 208, a luminance value of the display image for supplementing the DC component to the reproduced diffracted light is calculated. At step 210, the laser beams are irradiated from the light source 50, and a calculated luminance value is output from the personal computer 56 at a predetermined timing, and the reproduction processing of the hologram is executed, to finish the routine.

The method for supplementing the DC component (method of calculating the luminance value of the transmission pattern) is as described for the first exemplary embodiment, and hence description is omitted.

The reproduction processing of the hologram will be explained here.

The laser beams oscillated from the light source 50 are collimated to beams having a large diameter by the beam expander 55, and are irradiated onto the spatial light modulator 58. When the digital data from the personal computer 56 is input, the pattern generator 60 generates a signal light pattern according to the supplied digital data. The generated signal light pattern is combined with the reference light pattern, to generate a pattern to be displayed on the spatial light modulator 58. The spatial light modulator 58 intensity modulates the laser beams according to the display pattern, to generate a signal light and a reference light.

Similarly to the first exemplary embodiment, the central part of the spatial light modulator 58 is used for data display (for the signal light), and the peripheral part thereof is used for the reference light (refer to FIG. 3). The laser beams entering into the central part of the spatial light modulator 58 are polarized and modulated according to the display pattern, to generate the signal light. On the other hand, the laser beams entering into the peripheral part of the spatial light modulator 58 are polarized and modulated according to the display pattern, to generate the reference light. Thereafter, the signal light and the reference light are passed through a polarizing plate (not shown in the figure), and converted to an amplitude distribution.

The signal light and the reference light generated by the spatial light modulator 58 are Fourier-transformed by the lens 62. The Fourier-transformed signal light and reference light are irradiated to the mask 68, and the DC component is removed from the Fourier-transformed image of the signal light and the reference light. The signal light and the reference light not blocked by the mask 68 are inverse-Fourier transformed by the lens 64, Fourier-transformed again by the lens 66, and irradiated to the optical recording medium 72 simultaneously and coaxially. As a result, the signal light and the reference light interfere with each other in the optical recording medium 72, and an interference pattern is recorded as the hologram.

The reproduction processing of the hologram will be explained here.

The laser beams oscillated from the light source 50 are collimated to beams having a large diameter by the beam expander 55, and enter into the transmission type spatial light modulator 58. When the calculated luminance value from the personal computer 56 is input, the pattern generator 60 generates a transmission pattern according to the supplied luminance value. The generated transmission pattern is combined with the reference light pattern, to generate a display pattern to be displayed on the spatial light modulator 58.

Similarly to the first exemplary embodiment, a transmission pattern (pixels having the same luminance other than 0) is displayed on the central part of the spatial light modulator 58, and the reference light pattern the same as that of at the time of recording is displayed on the peripheral part of the spatial light modulator 58 (refer to FIG. 4). Accordingly, the laser beams entering to the central part of the spatial light modulator 58 pass therethrough, to generate the DC component of the signal light. On the other hand, the laser beams entering to the peripheral part of the spatial light modulator 58 are polarized and modulated according to the display pattern, to generate the reference light. Thereafter the DC component of the signal light and the reference light are transmitted through a polarizing plate (not shown in the figure) and converted to an amplitude distribution.

The DC component of the signal light and the reference light generated in the spatial light modulator 58 are Fourier-transformed by the lens 62. The Fourier-transformed DC component of the signal light and the reference light are inverse-Fourier transformed by the lens 64, Fourier-transformed again by the lens 66, and irradiated to an area of the optical recording medium 72 where the hologram is recorded.

The reference light irradiated to the optical recording medium 72 is diffracted by the hologram, and the diffracted light is passed through the optical recording medium 72 and output. Moreover, the DC component of the irradiated signal light is passed through the optical recording medium 72 and output. The diffracted light and the DC component of the signal light which have passed through the optical recording medium 72 are inverse-Fourier transformed by the lens 74, and enter into the photodetector 76. The reproduced image can be observed on a focal plane of the lens 74.

In this exemplary embodiment, the DC component of the signal light removed at the time of recording of the hologram is supplemented to the diffracted light. Therefore, the diffracted light having the same component as that of the original signal light is reproduced, and the original signal light pattern (image of intensity distribution) is reproduced. The reproduced image is detected by the photodetector 76. The detected analog data is A/D converted by the photodetector 76, and the image data of the reproduced image is input to the personal computer 56.

Figure 7A:
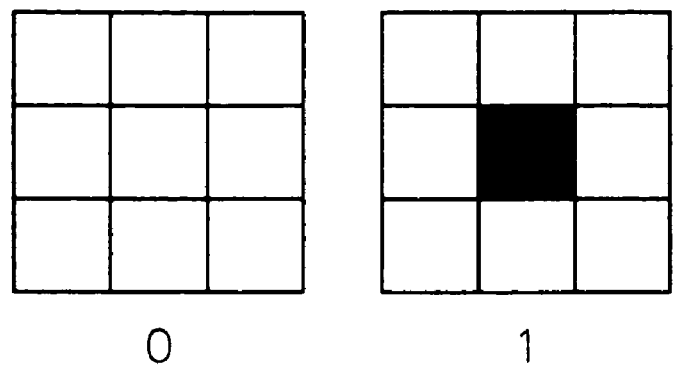
FIG. 7A is a diagram showing the configuration of a pixel block of a signal light having a high white proportion.

An experiment was performed using an apparatus of the same construction as the aforementioned hologram recording and reproduction apparatus. The pattern shown in FIG. 8A was displayed on the spatial light modulator 58. Moreover, the signal light pattern shown in FIG. 8B was displayed on the central portion of the spatial light modulator 58, and the hologram is recorded. The signal light pattern was a digital pattern with only the pixel at the center of the pixel block represented by 3×3 pixels as shown in FIG. 7A used as the signal light component, and with digital data [0, 1] generated as light (white pixels) and shade (black pixel). The 8 pixels in the vicinity of the signal light component becomes white pixels, and hence for the digital pattern, the ratio of white pixels become extremely high.

At the time of recording the hologram, the DC component of the signal light is removed by the mask 68, and irradiated onto the optical recording medium 72. At this time, the signal light pattern irradiated onto the optical recording medium 72 becomes a reverse image of the pattern displayed on the spatial light modulator 58. This is because, in the signal light pattern displayed on the spatial light modulator 58, since the ratio of the white pixels is high, the proportion occupied by the DC component in the whole Fourier component is extremely large (0.9 or more).

This large DC component increases the amplitude of the signals being originally white pixels, and reduces the amplitude of the signals being originally black pixels. However, since the DC component thereof is removed by the mask 68, the amplitude of the signals being originally white pixels is reduced, and the amplitude of the signals being originally black pixels is increased. Thus, in the intensity distribution, the "light" and "dark" become reversed in the resultant images. That is, the signal light pattern irradiated onto the optical recording medium 72 becomes a reversed image of the pattern displayed on the spatial light modulator 58.

Figure 9A:
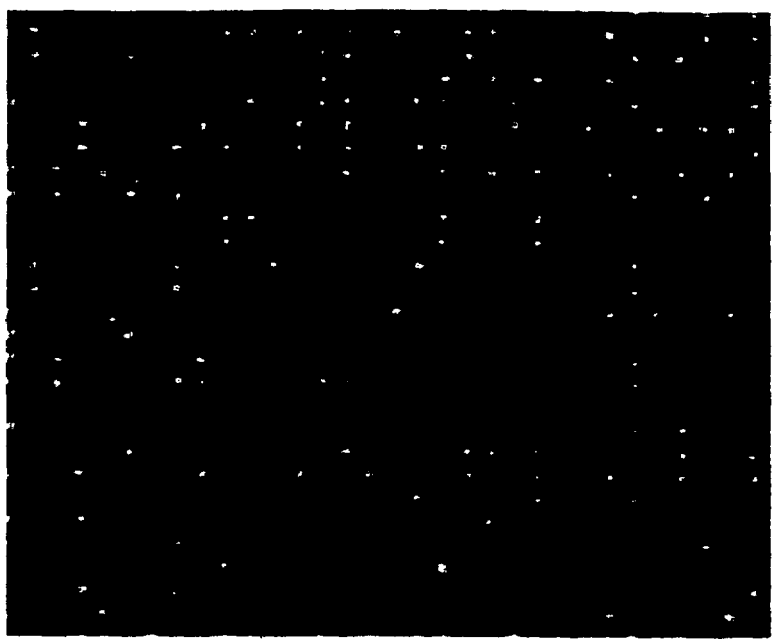
FIG. 9A is a diagram expressing a reproduced image when a 0-order component is not added.
Figure 9B:
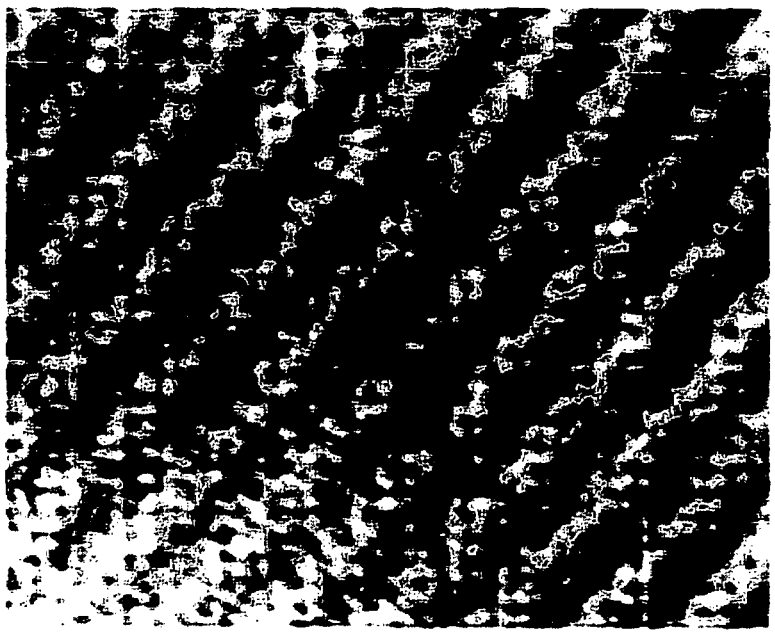
FIG. 9B is a diagram expressing a reproduced image when the 0-order component is added.

The recorded hologram is reproduced by (1) a method of irradiating only the reference light, and (2) the aforementioned method of irradiating both the reference light and the DC component of the signal light, and the reproduced image is observed. If the digital pattern with the high white pixel ratio is used, then in the method (1), the signal light pattern at the time of recording (the reverse image of the digital pattern displayed on the spatial light modulator 58 (the negative image)) is reproduced (refer to FIG. 9A). On the other hand, in the method (2), the reverse image of the signal light pattern at the time of recording (the positive image the same as the digital pattern displayed on the spatial light modulator 58) is reproduced (refer to FIG. 9B).

As described above, in the exemplary embodiment, the hologram is recorded in a state with the DC component removed from the Fourier-transformed image of the signal light. Accordingly, unnecessary exposure by the DC component of the signal light is prevented at the time of recording of the hologram, and the dynamic range can be effectively used, thereby improving the degree of multiplexing.

In this exemplary embodiment, the DC component of the signal light removed at the time of recording is supplemented to the diffracted light obtained from the recorded hologram at the time of reproduction of the hologram. Accordingly, the diffracted light having the same component as that of the original signal light is reproduced, and the original signal light pattern (image of intensity distribution) is reproduced. As a result, the digital data held by the signal light can be accurately decoded.

In order to optimize the recording conditions, it is preferable to execute defocus where the recording medium is moved to an area where the signal light and the reference light are overlapped. In the first exemplary embodiment and the second exemplary embodiment, it is necessary to make the focal position of the lens, and the position of the reflecting layer of the optical recording medium coincide. However since the optical recording medium is formed integral with the reflecting layer, the degree of freedom for defocusing the optical recording medium is minimal. On the other hand, in the third exemplary embodiment, since the transmission type optical recording medium is used, the degree of freedom for defocusing is large, so that the recording conditions can be easily designed.

Fourth Exemplary Embodiment

In the first through third exemplary embodiments, an example was described where the DC component was removed from the Fourier-transformed image of the signal light using a reflecting mirror which reflects the DC component, an absorption filter which absorbs the DC component, and the like as a mask. In the fourth exemplary embodiment, an example is described where the DC component is removed from the Fourier-transformed image of the signal light using a diffraction element which diffracts the DC component. The point that the signal light and the reference light can be irradiated to the optical recording medium coaxially, is the same as for the first through third exemplary embodiments.

Figure 10:
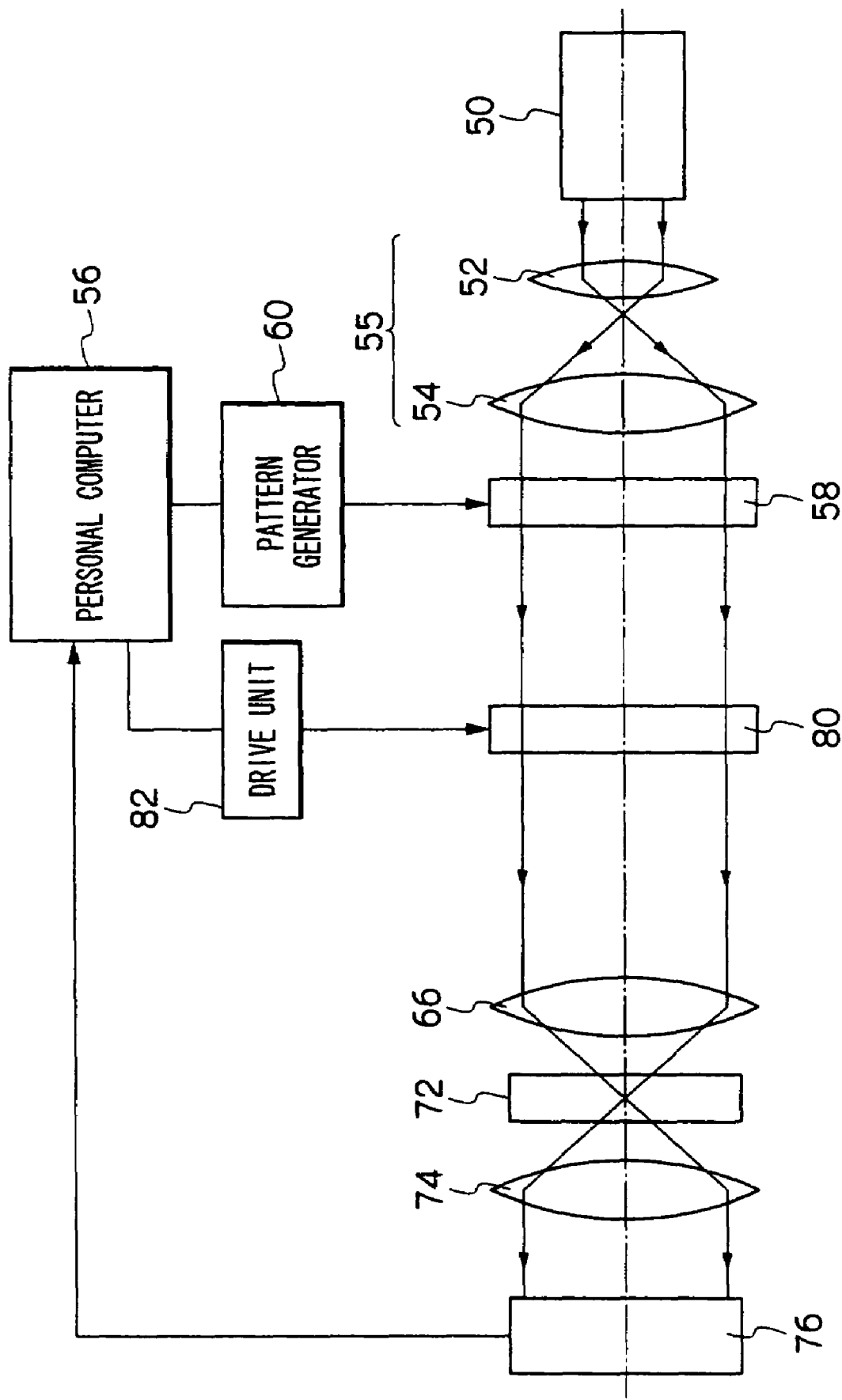
FIG. 10 is a diagram showing a schematic configuration of a hologram recording and reproduction apparatus according to a fourth exemplary embodiment.

FIG. 10 is a diagram showing a schematic configuration of a hologram recording and reproduction apparatus according to the fourth exemplary embodiment. Components similar to the apparatus according to the third exemplary embodiment are denoted by the same reference symbols, and description thereof is omitted. In this hologram recording and reproduction apparatus, a polarizing plate (not shown in the figure) is on a light transmission side of a spatial light modulator 58. A volume hologram element 80 which removes the DC component from the Fourier transformed image of the signal light by diffracting the DC component in a predetermined direction, and a Fourier transform lens 66 which irradiates signal light and reference light onto an optical recording medium 72, are arranged in this order on the light transmission side of the polarizing plate. Moreover the volume hologram element 80 is connected to a personal computer 56 via a drive unit 82, and is driven by the drive unit 82 so that it can be inserted and withdrawn with respect to the optical path.

For the volume hologram element 80, an element in which a Bragg condition coincides with the DC component (0-order component) of the signal light generated by the spatial light modulator 58 is used. By this volume hologram element 80, only the DC component of the signal light generated by the spatial light modulator 58 is diffracted in a predetermined direction. On the other hand, the components other than the DC component of the signal light do not coincide with the Bragg condition. Therefore these components pass through the volume hologram element 80 without being diffracted by the volume hologram element 80. As a result, the DC component is removed from the Fourier-transformed image of the signal light.

In the hologram recording and reproduction apparatus according to the fourth exemplary embodiment the configuration is different to that of the apparatus according to the second exemplary embodiment. Therefore the hologram recording method and reproduction method are different. However the processing routine of record/reproduction processing executed by the personal computer 56 conforms to the routine shown in FIG. 5. In addition, in the fourth exemplary embodiment, instead of the mask 68, the volume hologram element 80 is inserted into the optical path and withdrawn from the optical path by the drive unit 82.

At step 200, it is determined which one of the record processing and the reproduction processing is selected. When the record processing is selected, at step 202, the drive unit 82 is driven and the volume hologram element 80 is inserted into the optical path. At the next step 204, the laser beams are irradiated from the light source 50, and digital data is output from the personal computer 56 at a predetermined timing, and the record processing of the hologram is executed, to finish the routine.

When the reproduction processing is selected at step 200, then at step 206, the drive unit 82 is driven to withdraw the volume hologram element 80 from the optical path. At the next step 208, a luminance value of the display image for supplementing the DC component to the reproduced diffracted light is calculated. At step 210, the laser beams are irradiated from the light source 50, and a calculated luminance value is output from the personal computer 56 at a predetermined timing, and the reproduction processing of the hologram is executed, to finish the routine.

The method for supplementing the DC component (method of calculating the luminance value of the transmission pattern) is as described for the first exemplary embodiment, and hence description is omitted.

The reproduction processing of the hologram will be explained here.

The laser beams oscillated from the light source 50 are collimated to beams having a large diameter by the beam expander 55, and are irradiated onto the spatial light modulator 58. When the digital data from the personal computer 56 is input, the pattern generator 60 generates a signal light pattern according to the supplied digital data. The generated signal light pattern is combined with the reference light pattern, to generate a pattern to be displayed on the spatial light modulator 58. The spatial light modulator 58 polarization-modulates the laser beams according to the displayed pattern to generate the signal light and the reference light. Thereafter, the signal light and the reference light are passed through a polarizing plate (not shown in the figure), and converted to an amplitude distribution.

Similarly to the first exemplary embodiment, the central part of the spatial light modulator 58 is used for data display (for the signal light), and the peripheral part thereof is used for the reference light (refer to FIG. 3). The laser beams entering into the central part of the spatial light modulator 58 are polarized and modulated according to the display pattern, to generate the signal light. On the other hand, the laser beams entering into the peripheral part of the spatial light modulator 58 are polarized and modulated according to the display pattern, to generate the reference light. Thereafter, these are passed through a polarizing plate, and converted to an amplitude distribution of linearly polarized light.

The signal light and the reference light generated by the spatial light modulator 58 are irradiated to the volume hologram element 80, and the DC component is removed from the Fourier-transformed image of the signal light and the reference light. The signal light and the reference light that has passed through the volume hologram element 80 are Fourier transformed by the lens 66, and irradiated to the optical recording medium 72 simultaneously and coaxially. As a result, the signal light and the reference light interfere with each other in the optical recording medium 72, and an interference pattern is recorded as the hologram.

The reproduction processing of the hologram will be explained here.

The laser beams oscillated from the light source 50 are collimated to beams having a large diameter by the beam expander 55, and enter into the spatial light modulator 58. When the calculated luminance value from the personal computer 56 is input, the pattern generator 60 generates a transmission pattern according to the supplied luminance value. The generated transmission pattern is combined with the reference light pattern, to generate a display pattern to be displayed on the spatial light modulator 58.

Similarly to the first exemplary embodiment, a transmission pattern (pixels having the same luminance other than 0) is displayed on the central part of the spatial light modulator 58, and the reference light pattern the same as that of at the time of recording is displayed on the peripheral part of the spatial light modulator 58 (refer to FIG. 4). Accordingly, the laser beams entering to the central part of the spatial light modulator 58 pass therethrough, to generate the DC component of the signal light. On the other hand, the laser beams entering to the peripheral part of the spatial light modulator 58 are polarized and modulated according to the display pattern, to generate the reference light. Thereafter the DC component of the signal light and the reference light are transmitted through a polarizing plate (not shown in the figure) and converted to an amplitude distribution.

The DC component of the signal light and the reference light generated in the spatial light modulator 58 are Fourier-transformed by the lens 66, and irradiated to an area of the optical recording medium 72 where the hologram is recorded.

The reference light irradiated to the optical recording medium 72 is diffracted by the hologram, and the diffracted light is passed through the optical recording medium 72 and output. Moreover, the DC component of the irradiated signal light is passed through the optical recording medium 72 and output. The diffracted light and the DC component of the signal light which have passed through the optical recording medium 72 are inverse-Fourier transformed by the lens 74, and enter into the photodetector 76. The reproduced image can be observed on a focal plane of the lens 74.

In the fourth exemplary embodiment, the DC component of the signal light removed at the time of recording of the hologram is supplemented to the diffracted light. Therefore, the diffracted light having the same component as that of the original signal light is reproduced, and the original signal light pattern (image of intensity distribution) is reproduced. The reproduced image is detected by the photodetector 76. The detected analog data is A/D converted by the photodetector 76, and the image data of the reproduced image is input to the personal computer 56.

As described above, in the exemplary embodiment, the hologram is recorded in a state with the DC component removed from the Fourier-transformed image of the signal light. Accordingly, unnecessary exposure by the DC component of the signal light is prevented at the time of recording of the hologram, and the dynamic range can be effectively used, thereby improving the degree of multiplexing.

In the exemplary embodiment, the DC component of the signal light removed at the time of recording is supplemented to the diffracted light obtained from the recorded hologram at the time of reproduction of the hologram. Accordingly, the diffracted light having the same component as that of the original signal light is reproduced, and the original signal light pattern (image of intensity distribution) is reproduced. As a result, the digital data held by the signal light can be accurately decoded.

In the first through third exemplary embodiments, two lenses (lenses 22 and 24 in FIG. 1, and lenses 62 and 64 in FIG. 6) were used in order to install the mask for removing the DC component. Therefore, the optical system becomes large, and the number of components is increased. On the other hand, in the fourth exemplary embodiment, the role of the two lenses and the mask is performed by one volume hologram element. Therefore, miniaturization of the optical system, and a reduction in the number of components can be realized.

In the first through fourth exemplary embodiments, the description was for an example where the signal light and the reference light were irradiated to the optical recording medium coaxially. However, the signal light and the reference light may be irradiated from different directions to record the hologram. In this case, the mask or the volume hologram element is arranged on the optical path of the signal light, to remove the DC component from the Fourier transformed image of the signal light.

Fifth Exemplary Embodiment

A schematic configuration of a hologram recording and reproduction apparatus according to a fifth exemplary embodiment is the same as the first exemplary embodiment shown in FIG. 1, and hence description is omitted. As shown in the figure, in the recording and reproduction apparatus, signal light and reference light can be irradiated to the optical recording medium coaxially.

Figure 11:
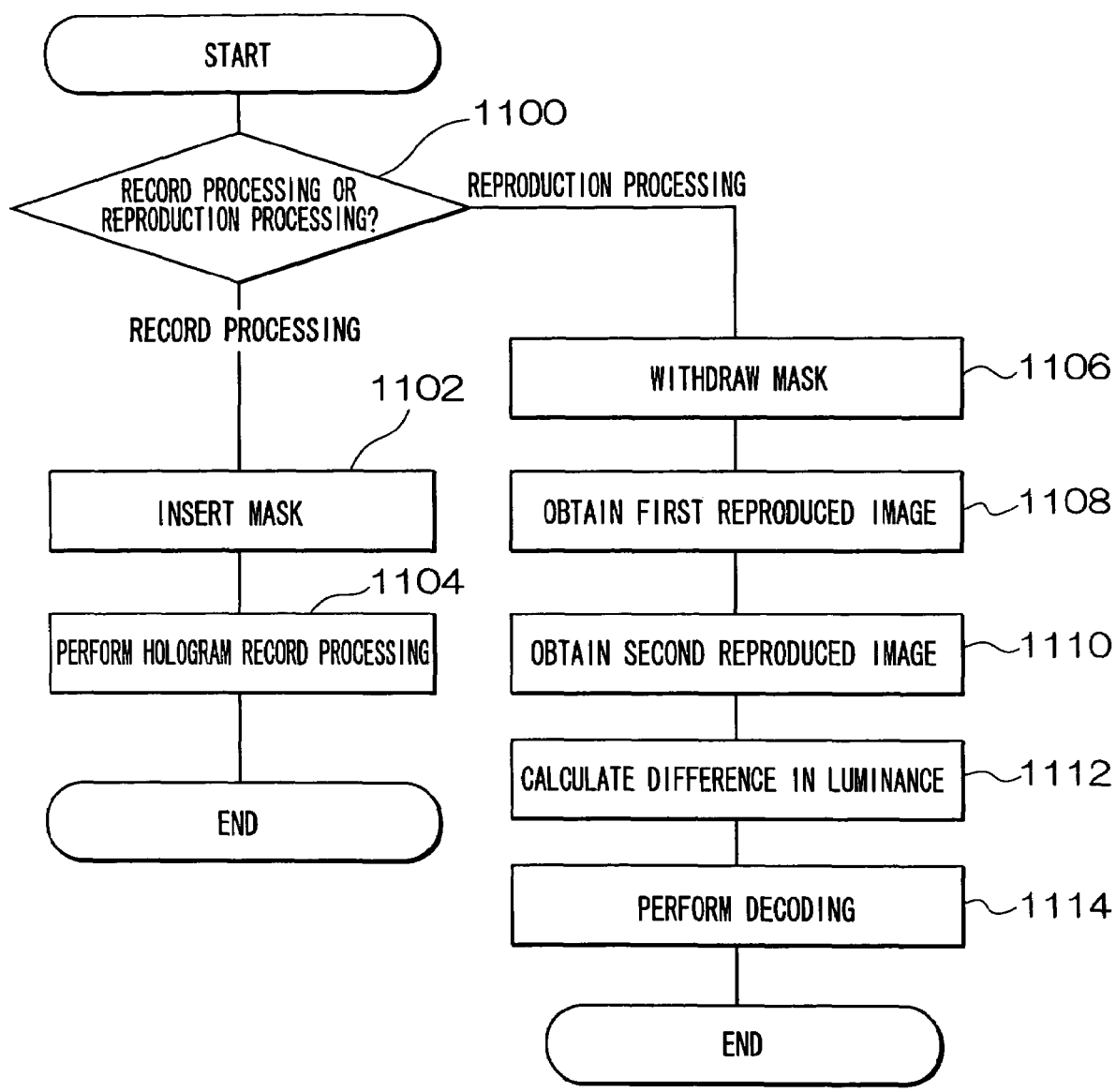
FIG. 11 is a flowchart showing a processing routine of record/reproduction processing of the fifth exemplary embodiment.

For the fifth exemplary embodiment, a processing routine of the record/reproduction processing executed by the personal computer 30 will be explained. FIG. 11 is a flowchart showing the processing routine of the record/reproduction processing. A user first operates an input device (not shown) connected to the personal computer 30, to select record processing or reproduction processing. When digital data is to be recorded as the hologram, the digital data to be recorded is input to the personal computer beforehand.

At step 1100, it is determined which one of the record processing and the reproduction processing is selected. When the record processing is selected, at step 1102, the drive unit 34 is driven and the mask 38 is inserted into the optical path. At the next step 1104, the laser beams are irradiated from the light source 10, and digital data is output from the personal computer 30 at a predetermined timing, and the record processing of the hologram is executed, to finish the routine.

In this exemplary embodiment, the two types of reproduced image, namely the first reproduced image and the second reproduced image are obtained, and these reproduced images are used to reproduce the digital data. Accordingly, when the reproduction processing is selected at step 1100 of FIG. 11, then at step 1106, the processing for obtaining the first reproduced image is started. That is, the drive unit 34 is driven to withdraw the mask 38 from the optical path. At the next step 1108, the laser beams are irradiated from the light source 10, and the processing for obtaining the first reproduced image is executed.

Here the processing for obtaining the first reproduced image is explained.

Figure 12A:
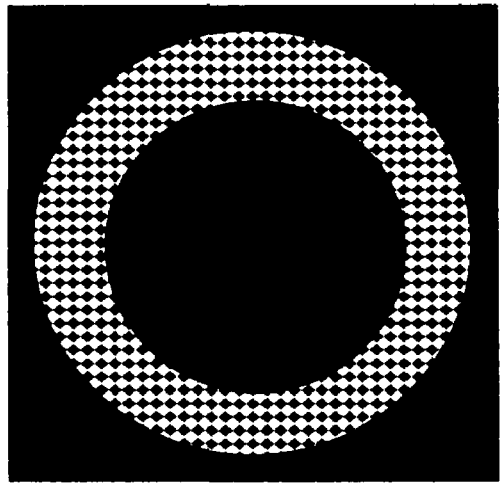
FIG. 12A is a diagram showing a display image of the spatial light modulator when a first reproduced image is obtained.

As shown in FIG. 12A, a shade pattern (all portions black pixels) is displayed on the central part of the spatial light modulator 18, and the reference light pattern the same as that of at the time of recording is displayed on the peripheral part of the spatial light modulator 18. Accordingly, only the laser beams entering to the peripheral part of the spatial light modulator 18 are polarized and modulated to generate the reference light, and after passing through the polarization beam splitter 16 and being converted to an amplitude distribution, only the reference light is irradiated to an area of the optical recording medium 28 where the hologram is recorded.

The irradiated reference light is diffracted by the hologram, and the diffracted light is reflected toward the lens 26 by the reflecting layer 28a in the optical recording medium 28. The reflected diffracted light is inverse-Fourier transformed by the lens 26, relayed by the lenses 24 and 22, converted to S-polarized light by the ¼ wave plate 20, enters into the polarization beam splitter 16, and is reflected toward the photodetector 36. The reproduced image can be observed on a focal plane of the lens 22. This reproduced image (first reproduced image) is detected by the photodetector 36. The detected analog data is A/D converted by the photodetector 36, and the image data of the first reproduced image is input to the personal computer 30, and stored in a RAM (not shown in the figure).

Next, at step 1110, a luminance value of the display image for supplementing the DC component to the reproduced diffracted light is calculated. The laser beams from the light source 10 are irradiated, and a calculated luminance value is output from the personal computer 30 at a predetermined timing, and the processing for obtaining the second reproduced image is executed.

Here the processing for obtaining the second reproduced image is explained.

As described above, reproduction of the original signal light pattern is realized as a result of interference between the diffracted light from the hologram and the supplemented DC component. In other words, the original signal light pattern is reproduced by setting a phase difference between the diffracted light and the DC component so as to increase the amplitude of an interfacial wave (the combined beams). The phase of the DC component can be set by appropriately changing the luminance of the pixels for the signal light of the spatial light modulator.

In this exemplary embodiment the case is explained for when the phase of the DC component to be supplemented is the same as that of the diffracted light from the hologram. In this case, in the inverse-Fourier transformed image (second reproduced image) of the combined beams, the bright portion of the original image of intensity distribution becomes brighter and the dark portion becomes darker.

Figure 12B:
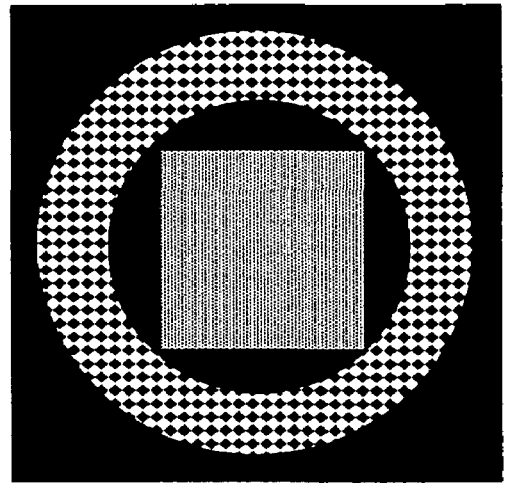
FIG. 12B is a diagram showing a display image of the spatial light modulator when a second reproduced image is obtained.

As shown in FIG. 12B, a transmission pattern (pixels having the same luminance other than 0) is displayed on the central part of the spatial light modulator 18, and the reference light pattern the same as that of at the time of recording is displayed on the peripheral part of the spatial light modulator 18. Accordingly, the laser beams entering to the central part of the spatial light modulator 18 pass through, to generate the DC component of the signal light. On the other hand, the laser beams entering to the peripheral part of the spatial light modulator 18 are polarized and modulated according to the display pattern, to generate the reference light. Then after passing through the polarization beam splitter 16 and being converted to an amplitude distribution, the generated DC component of the signal light and the reference light are irradiated to an area of the optical recording medium 28 where the hologram is recorded.

The calculation of the luminance value of the transmission pattern is performed by the same procedure as the calculation of the luminance value of the first exemplary embodiment, and hence description is omitted here.

Hereunder is a description of an example for the case of obtaining the second reproduction image under conditions satisfying the equation (2). In this case, the second reproduction image becomes a positive image the same as the image displayed on the spatial light modulator at the time of recording.

The reference light irradiated onto the optical recording medium 28 is diffracted by the hologram, and the diffracted light is reflected toward the lens 26 by the reflecting layer 28a in the optical recording medium 28. Moreover, the DC component of the signal light irradiated onto the optical recording medium 28 is reflected towards the lens 26 by the reflecting layer 28a in the optical recording medium 28. The reflected diffracted light and the DC component of the signal light are inverse-Fourier transformed by the lens 26, relayed by the lenses 24 and 22, converted to S-polarized light by the ¼ wave plate 20, enter into the polarization beam splitter 16, and are reflected toward the photodetector 36. The reproduced image can be observed on a focal plane of the lens 22.

This reproduced image (second reproduced image) is detected by the photodetector 36. The detected analog data is A/D converted by the photodetector 36, and the image data of the second reproduced image is input to the personal computer 30, and stored in the RAM (not shown in the figure).

On completion of obtaining the second reproduced image, the flow proceeds to the next step 1112, and the image data of the first reproduced image and the image data of the second reproduced image stored in the RAM are read out. Next the image data of the first reproduced image is subtracted from the image data of the second reproduced image, and the difference of the luminance for the respective pixels of the digital image (signal light) is calculated. In an inverse-Fourier transformed image (second reproduced image) of the combined beam, the bright portion of an original image of intensity distribution becomes brighter and the shade portion becomes darker. Accordingly, a difference obtained by subtracting the luminance of the first reproduced image from the luminance of the second reproduced image becomes positive in the bright portion of the original image of intensity distribution, and negative in the dark portion thereof.

In the case where one pixel of the signal light data corresponds to plural pixels of the photodetector 36, the difference to the average value of the luminance for the plural pixels of the photodetector 36 is calculated.

Then, at step 1114, the sign for each of the pixels is determined from the positive or negative of the calculated difference, and decoded to digital data, to finish the routine. As a result, the digital data held in the signal light is decoded with accuracy.

As described above, in the fifth exemplary embodiment, the hologram is recorded in a state with the DC component removed from the Fourier-transformed image of the signal light. Accordingly, unnecessary exposure by the DC component of the signal light is prevented at the time of recording of the hologram, and the dynamic range can be effectively used, thereby improving the degree of multiplexing.

Moreover, in the exemplary embodiment, the hologram is recorded in a state with the DC component removed from the Fourier-transformed image of the signal light. Here the first reproduced image is obtained from the diffracted light diffracted by the recorded hologram, and the second reproduced image is obtained from the combined beam of the diffracted light combined with the DC component of the Fourier-transformed image. Then the image data of the first reproduced image is subtracted from the image data of the second reproduced image, the difference in the luminance for the pixels is calculated, and the sign of the pixels is determined from the positive or negative of the calculated difference. Hence the digital data can be accurately reproduced.

Furthermore, according to the aforementioned encoding method, one bit can represent one pixel, and hence high recording density can be realized.

Sixth Exemplary Embodiment

In a sixth exemplary embodiment an example is described where the ratio of white pixels in the digital image (signal light) is increased, and the reverse image (negative image) of the image of intensity distribution is obtained as the first reproduced image, and the positive image is obtained as the second reproduced image.

From the result of various experiments, the present inventors obtained the finding that, when the DC component is removed in the case of a digital image (signal light) with an equal black-and-white ratio, the S/N dropped at the time of reproduction. Based on this finding, various configurations of data pages of a hologram are examined, and it is found that by increasing the ratio of the signal light component for each pixel of the digital image, or increasing the ratio of the white pixels for each image block (hereunder referred as image white ratio), the reverse image (negative image) of the signal light can be recorded and reproduced even with the DC component removed.

Figure 7B:
FIG. 7B is a negative image of FIG. 7A.
Figure 7C:
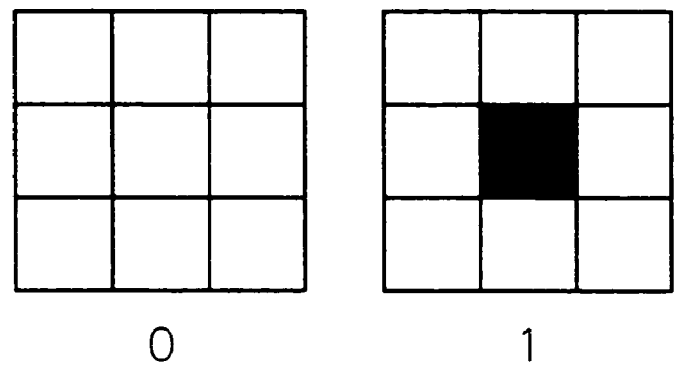
FIG. 7C is a positive image of FIG. 7A.

Therefore, a digital pattern was generated with only the pixel at the center of the pixel block represented by 3×3 pixels as shown in FIG. 7A used as the signal light component, and with digital data [0, 1] as light (white pixels) and shade (black pixel). The 8 pixels in the vicinity of the pixel representing the digital pattern become white pixels. In this case, in the first reproduced image, as shown in FIG. 7B, the contrast of the pixel at the center of the pixel block becomes a reversed negative image, and in the second reproduced image, as shown in FIG. 7C, this becomes a positive image the same as for the original digital pattern.

In this manner, the first reproduced image and the second reproduced image have a negative and positive relationship. Therefore when the difference in luminance for each pixel is calculated by subtracting the image data of the first reproduced image from the image data of the second reproduced image, the positive and negative of the calculated difference show up clearly. Accordingly it is possible to accurately determine the sign of each pixel, and the decoding accuracy of the digital data is further improved.

The schematic configuration of the hologram recording and reproduction apparatus according to the sixth exemplary embodiment is the same as for the third exemplary embodiment shown in FIG. 6, and hence description is omitted. In the fifth exemplary embodiment, a recording and reproduction apparatus which uses a reflection type spatial light modulator and a reflection type optical recording medium apparatus is described. In the sixth exemplary embodiment, a recording and reproduction apparatus which uses a transmission type spatial light modulator and a transmission type optical recording medium is described. The point that signal light and reference light can be irradiated to the optical recording medium coaxially, is the same as for the other exemplary embodiments.

In the hologram recording and reproduction apparatus according to the sixth exemplary embodiment the configuration is different to that of the apparatus according to the fifth exemplary embodiment, and hence the hologram recording method and the reproduction method are different. However the processing routine of the record reproduction processing executed by the personal computer 56 conform to the routine shown in FIG. 11.

At first, at step 1100, it is determined which one of the record processing and the reproduction processing is selected. When the record processing is selected, at step 1102, the drive unit 70 is driven and the mask 68 is inserted into the optical path. At the next step 1104, the laser beams are irradiated from the light source 50, and digital data is output from the personal computer 56 at a predetermined timing, and the record processing of the hologram is executed, to finish the routine.

Since the record processing of hologram in this exemplary embodiment is the same as for the third exemplary embodiment, description is omitted here.

Figure 8B:
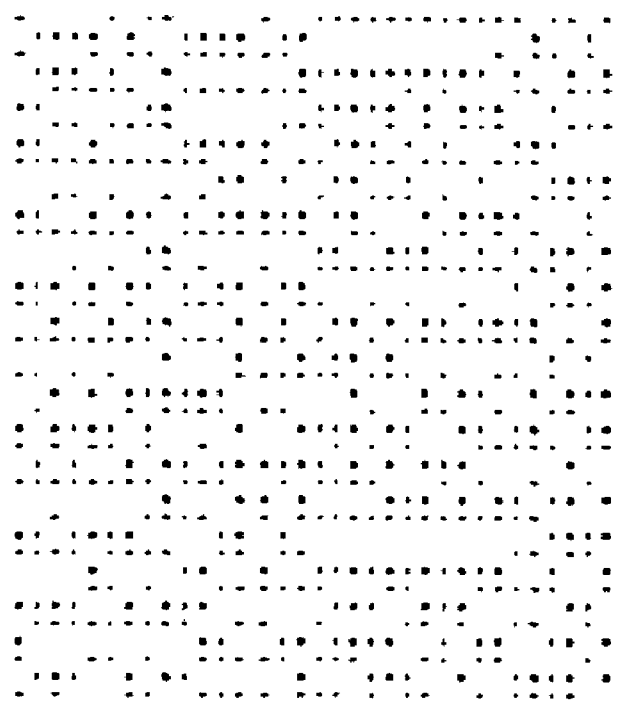
FIG. 8B illustrates a signal light pattern displayed at the center of the pattern in FIG. 8A.
Figure 8A:
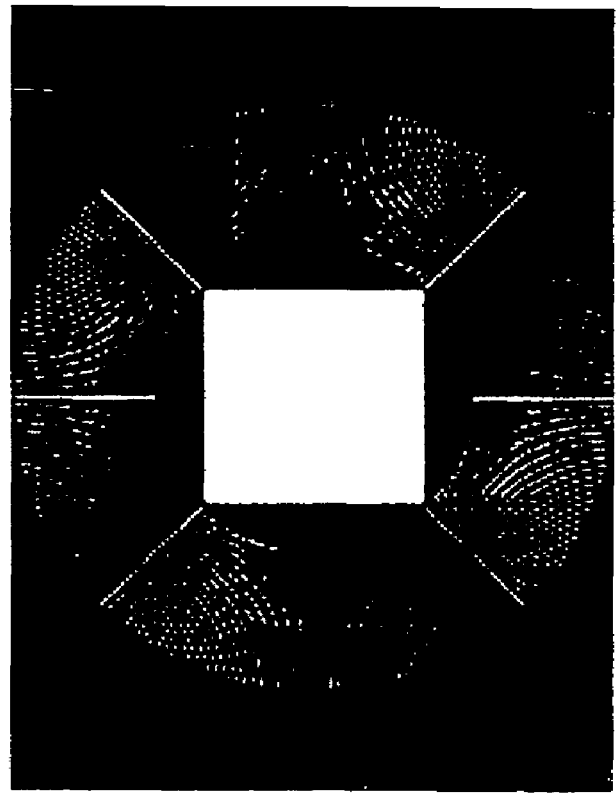
FIG. 8A illustrates a pattern displayed on the spatial light modulator in the third and the sixth exemplary embodiment.

In the present invention, the pattern shown in FIG. 8A is displayed on the spatial light modulator 58. On the central portion of the spatial light modulator 58, as shown in FIG. 8B, is displayed a digital pattern with only the pixel at the center of the pixel block represented by 3×3 pixels used as the signal light component, and with digital data [0, 1] generated as light (white pixels) and shade (black pixel). Therefore in this digital pattern, the ratio of white pixels become extremely high.

The signal light and the reference light generated by the spatial light modulator 58 are Fourier-transformed by the lens 62. The Fourier-transformed signal light and reference light are irradiated to the mask 68, and the DC component is removed from the Fourier-transformed image of the signal light and the reference light. The signal light and the reference light not blocked by the mask 68 are inverse-Fourier transformed by the lens 64, Fourier-transformed again by the lens 66, and irradiated to the optical recording medium 72 simultaneously and coaxially. As a result, the signal light and the reference light interfere with each other in the optical recording medium 72, and an interference pattern is recorded as the hologram.

When the reproduction processing is selected at step 1100 of FIG. 11, then at step 1106, the drive unit 34 is driven to withdraw the mask 38 from the optical path. At the next step 1108, the laser beams are irradiated from the light source 10, and processing for obtaining the first reproduced image is executed.

In the processing for obtaining the first reproduced image, as shown in FIG. 12A, a shade pattern (all portions black pixels) is displayed on the central part of the spatial light modulator 58, and the reference light pattern the same as that of at the time of recording is displayed on the peripheral part of the spatial light modulator 58. Accordingly, only the laser beams entering to the peripheral part of the spatial light modulator 58 are polarized and modulated to generate the reference light, and after being converted to an amplitude distribution by a polarizing plate (not shown in the figure), only the reference light is irradiated via lenses 62, 64, and 66 to an area of the optical recording medium 72 where the hologram is recorded.

The irradiated reference light is diffracted by the hologram, and the diffracted light is passed through the optical recording medium 72 and output. The output diffracted light is inverse-Fourier transformed by the lens 74, and enters into the photodetector 76. The reproduced image can be observed on a focal plane of the lens 74.

Figure 13C:
FIG. 13C illustrates an image after subtraction processing.
Figure 13B:
FIG. 13B illustrates a second reproduced image.
Figure 13A:
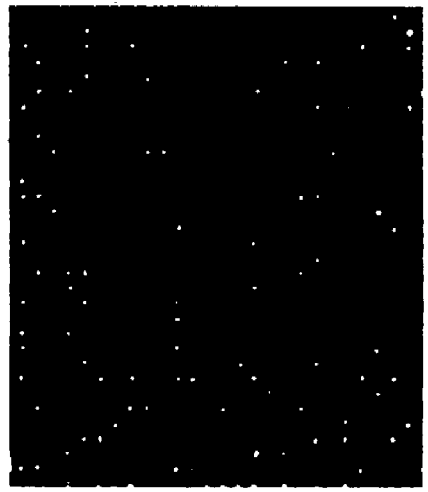
FIG. 13A illustrates a first reproduced image obtained in the sixth exemplary embodiment.

This reproduced image (first reproduced image) is detected by the photodetector 76. The detected analog data is A/D converted by the photodetector 76, and the image data of the first reproduced image is input to the personal computer 56, and stored in a RAM (not shown in the figure). In this exemplary embodiment, signal light with a high white ratio is used, and hence as shown in FIG. 13A, the first reproduced image becomes a negative image of the original image of intensity distribution.

Next, at step 1110 of FIG. 11, a luminance value of the display image for supplementing the DC component to the reproduced diffracted light is calculated. The laser beams from the light source 50 are irradiated, and a calculated luminance value is output from the personal computer 56 at a predetermined timing, and the processing for obtaining the second reproduced image is executed.

In the processing for obtaining the second reproduced image, as shown in FIG. 12B, a transmission pattern (pixels having the same luminance other than 0) is displayed on the central part of the spatial light modulator 58, and the reference light pattern the same as that of at the time of recording is displayed on the peripheral part of the spatial light modulator 58. Accordingly, the laser beams entering to the central part of the spatial light modulator 58 pass through, to generate the DC component of the signal light. On the other hand, the laser beams entering to the peripheral part of the spatial light modulator 58 are polarized and modulated according to the display pattern, to generate the reference light. Then after being converted to an amplitude distribution by a polarizing plate (not shown in the figure), the generated DC component of the signal light and the reference light are irradiated via lenses 62, 64, and 66 to an area of the optical recording medium 72 where the hologram is recorded.

The irradiated reference light is diffracted by the hologram, and the diffracted light is passed through the optical recording medium 72 and output. Moreover, the irradiated DC component of the signal light is transmitted through the optical recording medium 72. The transmitted diffracted light and the DC component of the signal light are inverse-Fourier transformed by the lens 74, and enter into the photodetector 76. The reproduced image can be observed on a focal plane of the lens 74.

This reproduced image (second reproduced image) is detected by the photodetector 76. The detected analog data is A/D converted by the photodetector 76, and the image data of the second reproduced image is input to the personal computer 56, and stored in the RAM (not shown in the figure). In this exemplary embodiment, signal light with a high white ratio is used, and hence as shown in FIG. 13B, the second reproduced image becomes a positive image of the original image of intensity distribution.

Next as a supplement, the principle of generating the positive and negative image in the present exemplary embodiment is described. At the time of recording, the DC components of the signal light and the reference light are removed by the mask 68, and irradiated onto the optical recording medium 72. At this time, the signal light pattern irradiated onto the optical recording medium 72 becomes a reverse image of the pattern displayed on the spatial light modulator 58. This is because, in the signal light pattern displayed on the spatial light modulator 58, since the white pixels are numerous, the proportion occupied by the DC component in the whole Fourier component is extremely large.

Due to this large DC component, the amplitude of the electric field of the signals being originally white pixels becomes large, and the amplitude of the electric field of the signals being originally black pixels becomes small. However, since the DC component thereof is removed by the mask 68, the amplitude of the electric field of signals being originally white pixel becomes small, and the amplitude of the electric field of the signals being originally black pixel becomes large. Thus, in the intensity distribution, the "light" and "dark" become reversed in the resultant images. That is, the signal light pattern irradiated onto the optical recording medium 72 becomes a reversed image of the pattern displayed on the spatial light modulator 58.

Accordingly, in obtaining the first reproduced image in step 1108 of FIG. 11, the signal light pattern at the time of recording (the reverse image of the digital pattern displayed on the spatial light modulator 58 (the negative image)) is reproduced. On the other hand, in obtaining the second reproduced image in step 1110, the reverse image of the signal light pattern at the time of recording (the positive image the same as the digital pattern displayed on the spatial light modulator 58) is reproduced.

On completion of obtaining the second reproduced image in step 1110 of FIG. 11, the flow proceeds to the next step 1112, and the image data of the first reproduced image and the image data of the second reproduced image stored in the RAM are read out. Next the image data of the first reproduced image is subtracted from the image data of the second reproduced image, and the difference of the luminance for the respective pixels of the digital image (signal light) is calculated. The image of intensity distribution generated based on the image data after subtraction processing is shown in FIG. 13C. In the image after the subtraction processing it is seen that the contrast is emphasized more than for the first reproduced image and the second reproduced image.

Then, at step 1114, the sign for the pixels is determined from the positive or negative of the calculated difference, and decoded to digital data, to finish the routine. As a result, the digital data held in the signal light is decoded with accuracy.

As described above, in the sixth exemplary embodiment, the hologram is recorded in a state with the DC component removed from the Fourier-transformed image of the signal light. Accordingly, unnecessary exposure by the DC component of the signal light is prevented at the time of recording of the hologram, and the dynamic range can be effectively used, thereby improving the degree of multiplexing.

Moreover, in the present exemplary embodiment, the hologram is recorded in a state with the DC component removed from the Fourier-transformed image of the signal light and the reference light. Here since a signal light having a high white proportion is used, the first reproduced image being the negative image of the signal light, and the second reproduced imaged being the positive image of the signal light, can be obtained. When the difference in luminance for each pixel is calculated by subtracting the image data of the first reproduced image from the image data of the second reproduced image, the positive and negative of the calculated difference show up clearly. Accordingly it is possible to accurately determine the sign of each pixel, and the decoding accuracy of the digital data is further improved.

Furthermore, according to the aforementioned encoding method, one bit can represent one pixel, and hence high recording density can be realized.

In the sixth exemplary embodiment, the description was for the case where the white proportion of the image in the digital image of the signal light was high. However the embodiment of the present invention is not limited to this case. As mentioned above, by controlling the phase difference between the diffracted light from the hologram, and the DC component, a reproduced image of the positive image and the negative image can be obtained from one hologram. By also subjecting these images to subtraction processing, the decoding accuracy of the digital data can be improved.

In the above exemplary embodiment, an example was described for where the image data of the first reproduced image was subtracted from the image data of the second reproduced image to calculate the difference in the luminance. However, the difference in the luminance may be calculated by subtracting the image data of the second reproduced image from the image data of the first reproduced image. In the case where there is a positive image and a negative image in the two reproduced images, then preferably the difference in the luminance is calculated by subtracting the image data of the negative image from the image data of the positive image. By subtracting the image data of the negative image from the image data of the positive image, the noise removal efficiency is improved.

In the above described exemplary embodiments, examples are shown where the signal light and the reference light are irradiated to the optical recording medium coaxially. However the embodiment of the present invention is not limited to this. For example an optical system may be used where the signal light and the reference light are propagated along different optical axes, and irradiated to the optical recording medium to record the hologram.

Moreover, in the fifth and sixth exemplary embodiments, examples are described for where the DC component of the signal light is not supplemented when obtaining the first reproduced image. However, the first reproduced image may be obtained by supplementing the DC component of the signal light. In this case, the DC component of the supplement signal light is selected so that the first reproduced image and the second reproduced image become reverse images, where the contrast are mutually reversed. For example, when obtaining the first reproduced image, the DC component of the supplement signal light is selected so as to satisfy the aforementioned equation (1) or equation (2). When obtaining the second reproduced image, the DC component of the supplement signal light is selected so as to satisfy the aforementioned equation (3) or equation (4).

In the above exemplary embodiments, the descriptions are for where the digital data is recorded as the hologram. However, even in the case where multivalued digital data is used, by calculating the difference in the luminance between the two reproduced images reproduced from the same hologram, the digital data can be accurately reproduced.

In the fifth and sixth exemplary embodiments, the descriptions are for where the image data of the first reproduced image and the image data of the second reproduced image are subjected to subtraction processing, to calculate the difference in the luminance, and the sign of the pixels is determined from the positive or negative of the calculated difference. However, this may be decoded into digital data using image data (third reproduced image) newly obtained by subtraction processing. In this third reproduced image, since the noise component contained in common with the first reproduced image and the second reproduced image is reduced by the subtraction processing, the S/N ratio is improved. Consequently digital data can be accurately reproduced.

For example, a coding method which expresses two pixels as 1 bit (white-black=0, black-white=1) is known (Science Vol. 265, pp 749-752 (1994)). In the case where such a coding method is used, the original digital date can be reproduced (decoded) from the third reproduced image obtained by subtraction processing.

As described above, in the hologram reproduction method of the exemplary embodiments, the Fourier transformed hologram is recorded in a state with the DC component of the signal light removed. At this time, the diffracted light from the recorded hologram and the DC component are combined, to generate a combined beam, and the combined beam is reproduced to the signal light by inverse Fourier transform. Therefore, the original signal light pattern can be reproduced from the recorded hologram. As a result, the digital data held by the signal light can be accurately decoded.

Moreover, the DC component of the signal light as well as the DC component of the reference light can also be removed.

Moreover, in the hologram reproduction method of the exemplary embodiments of the present invention, diffracted light from the recorded hologram and a combined beam in which the DC component of the signal light is superposed on the diffracted light are generated, and two types of image data are obtained from the diffracted light and the combined beam, or from two types of combined beams. By performing subtraction processing, using these two types of image data, and calculating the difference in luminance for each pixel, and determining the sign of each pixel from the positive or negative of the calculated difference, digital data can be accurately reproduced.

The hologram reproduction method of the exemplary embodiments can also be applied to the case that reading out a recorded hologram from an optical recording medium, in order to reproduce digital data contained in the hologram, where digital data is represented by a image of intensity distribution, and the hologram is recorded in the optical recording medium by Fourier transforming a signal light with the direct current component removed and a reference light and simultaneously irradiating them onto the optical recording medium. Moreover, additional step for decoding the digital data based on a value obtained by subtraction may be provided.

What is claimed is:

1. A hologram reproduction method for reproducing a hologram from an optical recording medium in which the hologram is recorded by Fourier transforming a signal light, in which digital data is represented by an image of intensity distribution, and a reference light, and simultaneously irradiating the lights in a state in which a direct current component is removed from at least the Fourier transformed signal light onto the optical recording medium, the method comprising:

irradiating a read out reference light onto the optical recording medium, and generating a diffracted light from the recorded hologram;

generating all or a part of the direct current component contained in a Fourier transformed image of the signal light;

combining the diffracted light and the generated all or a part of the direct current component, and generating a combined beam; and reproducing the signal light by inverse-Fourier transforming the combined beam.

2. The hologram reproduction method according to claim 1, further comprising increasing the contrast of the intensity of the combined beam.

3. The hologram reproduction method according to claim 1, wherein the combining further comprises combining the diffracted light and the direct current component so that a phase θ of the direct current component and a phase φ of the diffracted light satisfy the following equation (1):

$$0 \leq |\theta - \phi| < \pi/2 \qquad \text{Equation (1)}.$$

4. The hologram reproduction method according to claim 3, wherein the combining further comprises combining the diffracted light and the direct current component so that a phase θ of the direct current component and a phase φ of the diffracted light satisfy the following equation (2):

$$|\theta - \phi| = 0 \qquad \text{Equation (2)}.$$

5. The hologram reproduction method according to claim 1, wherein the combining further comprises combining the diffracted light and the direct current component so that a phase θ of the direct current component and a phase φ of the diffracted light satisfy the following equation (3):

$$\pi/2 < |\theta - \phi| \leq \pi \qquad \text{Equation (3)}.$$

6. The hologram reproduction method according to claim 5, wherein the combining further comprises combining the diffracted light and the direct current component so that a phase θ of the direct current component and a phase φ of the diffracted light satisfy the following equation (4):

$$|\theta - \phi| = \pi \qquad \text{Equation(4)}.$$

7. The hologram reproduction method according to claim 1, wherein
the reproducing of the signal light further comprises:
obtaining two pieces of image data by (a) detecting each of an inverse-Fourier transformed image of the diffracted light and the combined beam, or (b) detecting each of an inverse-Fourier transformed image of two pieces of combined beams; and
subtracting one of the two pieces of image data from the other for each pixel of the image of intensity distribution to create a calculated difference.

8. The hologram reproduction method according to claim 7, further comprising decoding the digital data based on a value obtained by the subtraction.

9. The hologram reproduction method according to claim 8, wherein the decoding further comprises, when a 1 of the digital data corresponds to a light portion and a 0 of the digital data corresponds to a dark portion, determining a sign of a pixel for which the calculated difference is positive as a 1, and determining a sign of a pixel for which the calculated difference is negative as a 0, the sign of the pixel representing a light or dark degree of luminence.

10. The hologram reproduction method according to claim 7, wherein the generating of one more combined beams further comprises:
generating a first combined beam by combining the diffracted light and a first direct current component; and
generating a second combined beam by combining the diffracted light and a second direct current component of a phase different from that of the first direct current component.

11. The hologram reproduction method according to claim 10, wherein a phase of the first direct current component and a phase of the second direct current component are made to be different, so that the first image data and the second image data become mutually reversed images.

12. A hologram reproduction apparatus for reproducing a hologram from an optical recording medium in which the hologram is recorded by Fourier transforming a signal light, in which digital data is represented by an image of intensity distribution, and a reference light, and simultaneously irradiating the lights in a state in which a direct current component is removed from at least the Fourier transformed signal light onto the optical recording medium, the apparatus comprising:
an irradiating section that irradiates a read out reference light onto the optical recording medium on which the hologram is recorded;
a generating section that generates all or a part of the direct current component contained in a Fourier transformed image of the signal light; and
an optical system that inverse-Fourier transforms a combined beam of diffracted light, obtained by irradiating the read out reference light onto the optical recording medium, and the generated all or a part of the direct current component.

13. The hologram reproduction apparatus according to claim 12 further comprising:
a combined beam generating section that generates a combined beam by combining the direct current component of the signal light with diffracted light diffracted by the recorded hologram;
an image data obtaining section that obtains reproducing image data by detecting an inverse-Fourier transformed image of the diffracted light or the combined beam;
a control section for controlling the irradiating section, the combined beam generating section, and the image data obtaining section, so as to irradiate the read out reference light onto the optical recording medium, generate the diffracted light from the recorded hologram, and combine the direct current component of signal light with the diffracted light to generate the combined beam, and obtain two pieces of image data by (a) detecting each of an inverse-Fourier transformed image of the diffracted light and the combined beam, or (b) detecting each of an inverse-Fourier transformed image of two combined beams; and
a computing section for subtracting one of the two pieces of image data from the other for each pixel of the image of intensity distribution to create a calculated difference.

14. The hologram reproduction apparatus according to claim 13, further comprising a decoding section that decodes the digital data based on a value obtained by the subtraction by the computing section.

15. The hologram reproduction apparatus according to claim 14, wherein the decoding section determines, when a 1 of the digital data corresponds to a light portion and a 0 of the digital data corresponds to a dark portion, a sign of a pixel for which the calculated difference is positive as a 1, and a sign of a pixel for which the calculated difference is negative as a 0, the sign of the pixel representing a light or dark degree of luminence.

16. The hologram reproduction apparatus according to claim 13, wherein the control section controls the generating of the combined beam so as to generate a first combined beam by combining the diffracted light and a first direct current component, and generate a second combined beam by combining the diffracted light and a second direct current component of a phase different from that of the first direct current component.

17. The hologram reproduction apparatus according to claim 16, wherein the control section controls the phase of the first direct current component and the phase of the second direct current component to be different, so that the first image data and the second image data become mutually reversed images.

18. The hologram reproduction apparatus according to claim 12, wherein the hologram reproduction apparatus is configured to combine the diffracted light and the direct current component so as to increase the contrast of the intensity of the combined beam.

19. The hologram reproduction apparatus according to claim 12, wherein the combined beam is formed by combining the diffracted light and the direct current component so that a phase θ of the direct current component and a phase φ of the diffracted light satisfy the following equation (1):

$$0 \leq |\theta - \phi| < \pi/2 \qquad \text{Equation(1)}.$$

20. The hologram reproduction apparatus according to claim 12, wherein the combined beam is formed by combining the diffracted light and the direct current component so that a phase θ of the direct current component and a phase φ of the diffracted light satisfy the following equation (3):

$$\pi/2 < |\theta - \phi| \leq \pi \qquad \text{Equation(3)}.$$

* * * * *